US012585479B2

(12) United States Patent
Icacan et al.

(10) Patent No.: US 12,585,479 B2
(45) Date of Patent: Mar. 24, 2026

(54) ANALYTICS SEARCH ON WORKSPACE CONTENT

(71) Applicant: Notion Labs, Inc., San Francisco, CA (US)

(72) Inventors: Birkan Icacan, San Francisco, CA (US); Gabriel Borges, San Francisco, CA (US); Varun Rau, San Francisco, CA (US); Nick Zuber, San Francisco, CA (US); Celine Nguyen, San Francisco, CA (US)

(73) Assignee: Notion Labs, Inc., San Francisco, CA (US)

( * ) Notice: Subject to any disclaimer, the term of this patent is extended or adjusted under 35 U.S.C. 154(b) by 44 days.

(21) Appl. No.: 18/626,234

(22) Filed: Apr. 3, 2024

(65) Prior Publication Data

US 2025/0200207 A1     Jun. 19, 2025

Related U.S. Application Data

(60) Provisional application No. 63/610,069, filed on Dec. 14, 2023.

(51) Int. Cl.
| | |
|---|---|
| *H04L 29/06* | (2006.01) |
| *G06F 3/0482* | (2013.01) |
| *G06F 9/451* | (2018.01) |
| *G06F 21/62* | (2013.01) |

(52) U.S. Cl.
CPC ............ *G06F 9/451* (2018.02); *G06F 3/0482* (2013.01); *G06F 21/6209* (2013.01); *G06F 21/6218* (2013.01); *G06F 21/6227* (2013.01)

(58) Field of Classification Search
CPC ...................................................... G06F 9/451
See application file for complete search history.

(56) References Cited

U.S. PATENT DOCUMENTS

| | | | |
|---|---|---|---|
| 8,244,761 B1 | 8/2012 | Dickens et al. | |
| 8,245,141 B1* | 8/2012 | Fuller | ................... H04L 63/104 715/741 |
| 10,706,056 B1* | 7/2020 | Lin | ..................... H04L 63/1425 |
| 10,984,496 B1 | 4/2021 | Rabb et al. | |
| 11,687,701 B1* | 6/2023 | Teton-Landis | ........ G06F 40/169 715/234 |
| 2006/0195449 A1* | 8/2006 | Hunter | ................. G06F 21/6227 707/999.009 |
| 2011/0023068 A1 | 1/2011 | Zeldis et al. | |

(Continued)

*Primary Examiner* — Jason K Gee

(74) *Attorney, Agent, or Firm* — Perkins Coie LLP; Alberto Araiza; Lena Petrovic

(57) ABSTRACT

A system provides a workspace through an interface. The workspace includes multiple pages associated with multiple permissions. A permission among the multiple permissions associated with a page among the multiple pages defines one or more users having access to the page. The multiple pages are organized in a hierarchical structure including a parent page and a child page. The child page inherits a permission associated with the parent page. The system receives an indication to provide analytics information associated with the workspace to a user. Based on the multiple permissions associated with multiple pages included in the workspace, the system determines a subset of pages among the multiple pages. The system provides analytics information associated with the subset of pages to the user.

20 Claims, 15 Drawing Sheets

(56) References Cited

U.S. PATENT DOCUMENTS

| | | |
|---|---|---|
| 2011/0099507 A1 | 4/2011 | Nesladek et al. |
| 2012/0124517 A1 | 5/2012 | Landry et al. |
| 2012/0173884 A1 | 7/2012 | Patil |
| 2012/0311672 A1* | 12/2012 | Connor ................... H04L 63/10 |
| | | 726/4 |
| 2013/0055089 A1 | 2/2013 | Gundotra et al. |
| 2014/0046809 A1 | 2/2014 | Baker et al. |
| 2022/0103495 A1 | 3/2022 | Boyd et al. |
| 2022/0179986 A1* | 6/2022 | Veeramachaneni ... G06F 3/0622 |

* cited by examiner

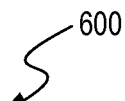

600

602 Provide quick access content search page presented on interface of workspace including control item for filtering pages of the workspace based on external sharing and control item for filtering pages of the workspace based on internet sharing 604 Provide a list of content entries of pages that have been shared outside the workspace in response to a user input 606 Provide list of content entries of pages that have been shared on the internet

<u>802</u> A system can provide workspace through interface

<u>804</u> Receive indication to provide analytics information associated with workspace <u>806</u> Determine subset of pages among multiple pages that user can have permission to access <u>808</u> Provide analytics information associated with the subset of pages to the user

ANALYTICS SEARCH ON WORKSPACE CONTENT

BACKGROUND

Workspaces (e.g., digital workspaces) refer to environments that assemble tools and platforms that allow users to work, communicate, and produce work products together. Workspaces can be desktop or web-based applications that allow multiple users to share and access the workspaces in a variety of manners. Workspaces can include compilations of electronic documents that can be organized within the workspace.

Searching content within a workspace can be done by built-in tools. Content searching generally includes, for example, filtering data by dates, file types, keywords, or users who have created electronic documents stored on the workspace.

BRIEF DESCRIPTION OF THE DRAWINGS

Reference will now be made, by way of example, to the accompanying drawings, which show example embodiments of the present application and in which:

FIG. 6 is a flow diagram illustrating processes for providing a quick-access content search on an interface of the workspace.

Figure 1:
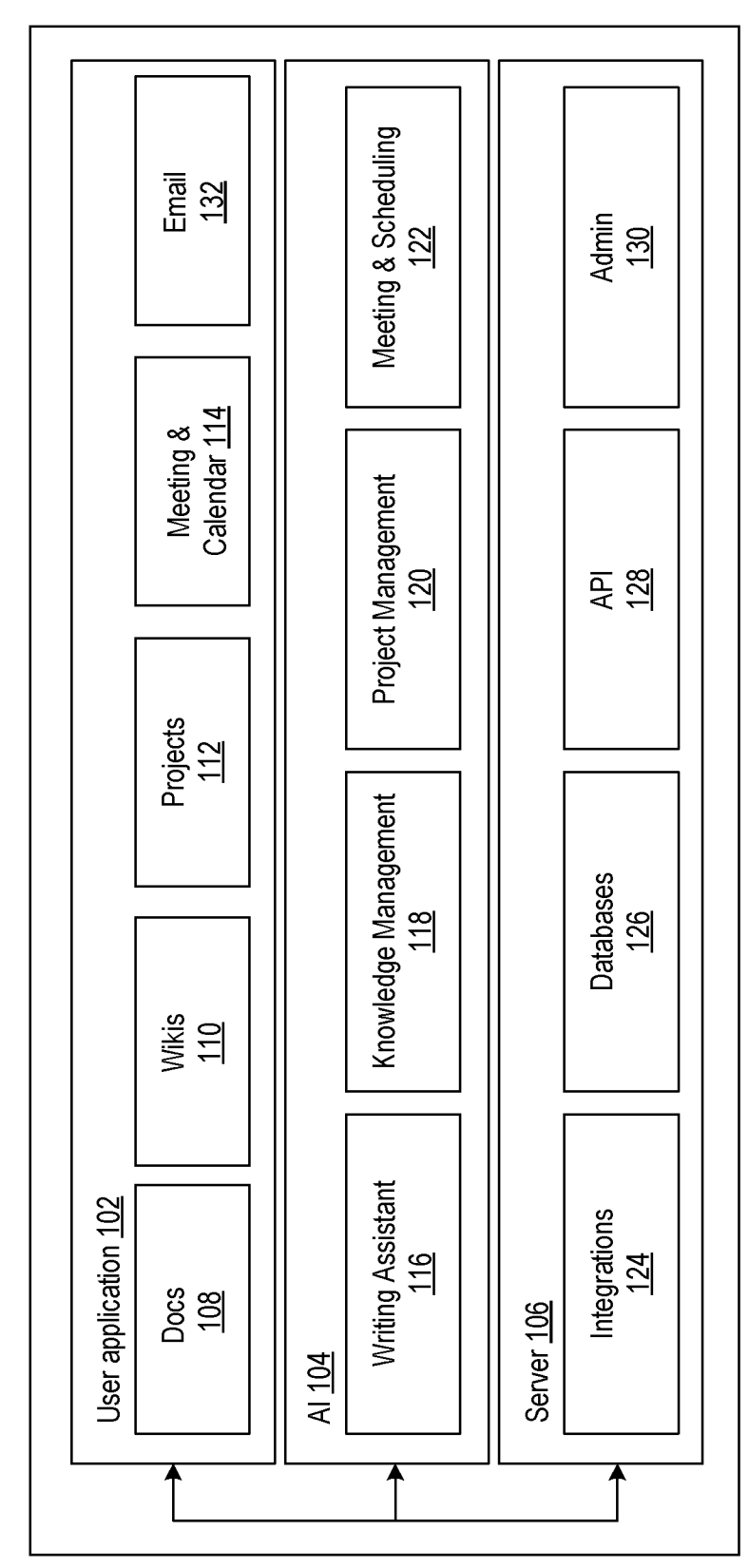
FIG. 1 is a block diagram illustrating a platform, which may be used to implement examples of the present disclosure.

The technologies described herein will become more apparent to those skilled in the art by studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

The present technology provides methods and systems for an enhanced content search on a workspace. Specifically, the present technology describes a content search tool that allows a workspace owner (e.g., an administrative user managing user accounts and permissions of the workspace) to conveniently and efficiently search for and review content stored in the workspace and modify access permissions associated with pages of the workspace. The content search tool increases the workspace owner's capability to ensure that the content of the workspace is shared safely and properly.

An aspect of the technology provides a user with a content search page presented on an interface (e.g., a graphical user interface) of the workspace. The content search page can include a list of content entries (e.g., a title and related metadata) that indicate pages of the workspace. The pages are associated with access permissions that indicate a group of users (e.g., a group of one or more users) that have permission to view and/or edit the pages. Specifically, the list of content entries can include pages that the workspace owner has permission to access as well as pages that the workspace owner does not have permission to access. In response to a user input on a particular content entry, the present technology allows the workspace owner to conveniently modify the access permission to the page associated with the particular content entry.

In one example, a system provides a content list on a content search page presented on an interface of a workspace that includes multiple pages. The content list can include multiple content entries. Each content entry of the multiple content entries can include a title and metadata associated with a respective page of the multiple pages of the workspace. A page of the multiple pages is associated with an access permission defining users' permissions to access the page. The content list includes content entries associated with pages that a user viewing the content search page does not have an access permission to access. In response to a user input on a particular content entry on the content list, the system can provide an access permission control item for changing the access permission to access the page associated with the particular content entry. The access permission control item can indicate that the user does not have access to view the content of the page. In response to a user input on the access permission control item, the system can modify the access permission of the page associated with the particular content entry even though the user requesting the modification associated with the access permission does not have access to view the content of the page. Changing the access permission can include adding or removing users from a group of one or more users who have the access permission to access the page.

In one example, a system provides a content list on a content search page presented on an interface of a workspace that includes multiple pages. The content list can include multiple content entries. A page of the multiple pages can be associated with an access permission defining users' permissions to access the page. In response to a user input on a particular content entry on the content list, the system can provide an access permission control item for changing the access permission to access the page associated with the particular content entry. The access permission control item can indicate that the user does not have access to view the content of the page. In response to a user input on the access permission control item, the system can modify the access permission of the page associated with the particular content entry even though the user requesting the modification associated with the access permission does not have access to view the content of the page.

In yet another example, a method performed on a workspace that includes multiple pages and being presented on an interface includes providing a content list on a content search page presented on the interface of the workspace. The content list can include multiple content entries. A page of the multiple pages can be associated with an access permission defining users' permissions to access the page. In response to a user input on a particular content entry on the content list, the method includes providing an access permission control item for changing the access permission to access the page associated with the particular content entry. The access permission control item can indicate that the user does not have access to view the content of the page. In response to a user input on the access permission control item, the method can include changing the access permission of the page associated with the particular content entry even though the user requesting the modification associated with the access permission does not have access to view the content of the page.

The present technology provides for methods and systems for an enhanced content search on a workspace by providing a quick access search tool (e.g., a quick access search page). The tool can be accessible by workspace owners of the workspace. Specifically, the tool is useful for monitoring and controlling access permissions associated with the pages of the workspace. The access permissions are significant for ensuring the safety and integrity of the workspace, especially when the workspace includes content that can be confidential and meant to be shared only internally with the users associated with the workspace. The quick access search tool allows the workspace user to obtain a list of content entries associated with pages that have been shared outside the organization. For example, the pages can be shared with a broad audience on the internet or with designated users (also called guest users) via messaging or email.

In one example, a system provides a quick access content search page presented on an interface of a workspace. The quick access content search page can include a control item for filtering pages of the workspace based on external sharing and a control item for filtering pages of the workspace based on internet sharing. The multiple pages can include parent pages, and child pages are hierarchically organized within the workspace. A child page can be a subpage of a parent page of the multiple pages. The child page can inherit an access permission of the parent page at a time when the child page is generated. The access permission can correspond to the external sharing or the internet sharing. In response to a user input on the control item for filtering content based on the external sharing, the system can provide a list of content entries of pages that have been shared outside the workspace. In response to a user input on the control item for filtering content based on internet sharing, the system can provide a list of content entries of pages that have been shared on the internet. Each content entry on the list of content entries of pages that have been shared outside the workspace and the list of content entries of pages that have been shared on the internet can include a title and metadata associated with a respective page. The metadata can indicate an access permission defining users' permissions to access the associated page. The list of content entries of pages that have been shared outside the workspace and the list of content entries of pages that have been shared on the internet can include content entries associated with pages that a user viewing the content search page does not have an access permission to access.

In another example, a system provides a quick access content search page presented on an interface of a workspace. The quick access content search page can include a control item for filtering pages of the workspace based on external sharing and a control item for filtering pages of the workspace based on internet sharing. The pages can include parent pages and child pages that are hierarchically organized within the workspace. The child page can inherit an access permission of the parent page at a time when the child page is generated. The access permission can correspond to the external sharing or the internet sharing. In response to a user input on the control item for filtering content based on the external sharing, the system can provide a list of content entries of pages that have been shared outside the workspace. In response to a user input on the control item for filtering content based on the internet sharing, the system can provide a list of content entries of pages that have been shared on the internet.

In yet another example, a method includes providing a control item for filtering pages of the workspace based on external sharing and a control item for filtering pages of the workspace based on internet sharing on a quick access content search page presented on the interface. The pages can include parent pages and child pages that are hierarchically organized within the workspace. The child page can inherit an access permission of the parent page at a time when the child page is generated. The access permission can correspond to the external sharing or the internet sharing. In response to a user input on the control item for filtering content based on the external sharing, the method can include providing a list of content entries of pages that have been shared outside the workspace. In response to a user input on the control item for filtering content based on internet sharing, the method can include providing a list of content entries of pages that have been shared on the internet.

The present technology provides for methods and systems for an enhanced analytics search on a workspace by providing an analytics information review and search tool (e.g., an analytics review page). The analytics review and search tool can be configured to provide users with statistical information associated with user engagement with the workspace. The user engagement can help to evaluate, for example, how useful or popular certain content on the workspace is, how well the workspace works for its users, and to identify content that is engaging or not engaging.

In some aspects, the statistical information provided to the user is based on the access permissions that the user has for content on the workspace. For example, each page on the workspace is associated with an access permission that defines whether the user is allowed to view and/or edit the page. The statistical information provided related to the user engagement with particular pages on the workspace can depend on the information associated with pages that the user has a permission to access. For example, a user can review a list of the most viewed and/or edited pages on the workspace (e.g., within a particular time range), including pages that the user has a permission to access.

In one example, a system provides a workspace through an interface. The workspace can include multiple pages associated with multiple permissions. A permission among the multiple permissions associated with a page among the multiple pages can define one or more users having access to the page. The multiple pages can be organized in a hierarchical structure including a parent page and a child page. The child page can inherit a permission associated with the parent page. The system can receive an indication to provide analytics information associated with the workspace to a user. The analytics information can include user engagement activities associated with the multiple pages within the workspace. The user engagement activities can be obtained based on metadata associated with the multiple pages. Based on the multiple permissions associated with multiple pages included in the workspace, the system can determine a subset of pages among the multiple pages. The user can have a permission to access the subset of pages. The system can provide analytics information associated with the subset of pages to the user.

In another example, a system provides a workspace through an interface. The workspace can include multiple pages associated with multiple permissions. A permission among the multiple permissions associated with a page among the multiple pages defines one or more users having access to the page. The multiple pages can be organized in a hierarchical structure including a parent page and a child page. The child page can inherit a permission associated with the parent page. The system can receive an indication to provide analytics information associated with the workspace to a user. Based on the multiple permissions associated with multiple pages included in the workspace, the system can determine a subset of pages among the multiple pages. The system can provide analytics information associated with the subset of pages to the user.

In yet another example, a method can include providing a workspace through an interface. The workspace can include multiple pages associated with multiple permissions. A permission among the multiple permissions associated with a page among the multiple pages defines one or more users having access to the page. The multiple pages can be organized in a hierarchical structure including a parent page and a child page. The child page can inherit a permission associated with the parent page. The method can include receiving an indication to provide analytics information associated with the workspace to a user. Based on the multiple permissions associated with multiple pages included in the workspace, the method can include determining a subset of pages among the multiple pages and providing analytics information associated with the subset of pages to the user.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail to avoid unnecessarily obscuring the descriptions of examples.

Block Data Model

The disclosed technology includes a block data model ("block model"). The blocks are dynamic units of information that can be transformed into other block types and move across workspaces. The block model allows users to customize how their information is moved, organized, and shared. Hence, blocks contain information but are not siloed.

Blocks are singular pieces that represent all units of information inside an editor. In one example, text, images, lists, a row in a database, etc., are all blocks in a workspace. The attributes of a block determine how that information is rendered and organized. Every block can have attributes including an identifier (ID), properties, and type. Each block is uniquely identifiable by its ID. The properties can include a data structure containing custom attributes about a specific block. An example of a property is "title," which stores text content of block types such as paragraphs, lists, and the title of a page. More elaborate block types require additional or different properties, such as a page block in a database with user-defined properties. Every block can have a type, which defines how a block is displayed and how the block's properties are interpreted.

A block has attributes that define its relationship with other blocks. For example, the attribute "content" is an array (or ordered set) of block IDs representing the content inside a block, such as nested bullet items in a bulleted list or the text inside a toggle. The attribute "parent" is the block ID of a block's parent, which can be used for permissions. Blocks can be combined with other blocks to track progress and hold all project information in one place.

A block type is what specifies how the block is rendered in a user interface (UI), and the block's properties and content are interpreted differently depending on that type. Changing the type of a block does not change the block's properties or content—it only changes the type attribute. The information is thus rendered differently or even ignored if the property is not used by that block type. Decoupling property storage from block type allows for efficient transformation and changes to rendering logic and is useful for collaboration.

Blocks can be nested inside of other blocks (e.g., infinitely nested sub-pages inside of pages). The content attribute of a block stores the array of block IDs (or pointers) referencing those nested blocks. Each block defines the position and order in which its content blocks are rendered. This hierarchical relationship between blocks and their render children are referred to herein as a "render tree." In one example, page blocks display their content in a new page, instead of rendering it indented in the current page. To see this content, a user can be required to click into the new page.

In the block model, indentation is structural (e.g., reflects the structure of the render tree). In other words, when a user indents something, the user is manipulating relationships between blocks and their content, not just adding a style. For example, pressing Indent in a content block can add that block to the content of the nearest sibling block in the content tree.

Blocks can inherit permissions of blocks in which they are located (which are above them in the tree). Consider a page: to read its contents, a user must be able to read the blocks within that page. However, there are two reasons one cannot use the content array to build the permissions system. First, blocks are allowed to be referenced by multiple content arrays to simplify collaboration and a concurrency model. But because a block can be referenced in multiple places, it is ambiguous which block it would inherit permissions from. The second reason is mechanical. To implement permission checks for a block, one needs to look up the tree, getting that block's ancestors all the way up to the root of the tree (which is the workspace). Trying to find this ancestor path by searching through all blocks' content arrays is inefficient, especially on the client. Instead, the model uses an "upward pointer"—the parent attribute—for the permission system. The upward parent pointers and the downward content pointers mirror each other.

A block's life starts on the client. When a user takes an action in the interface—typing in the editor, dragging blocks around a page—these changes are expressed as operations that create or update a single record. The "records" refer to persisted data, such as blocks, users, workspaces, etc. Because many actions usually change more than one record, operations are batched into transactions that are committed (or rejected) by the server as a group.

Creating and updating blocks can be performed by, for example, pressing Enter on a keyboard. First, the client defines all the initial attributes of the block, generating a new unique ID, setting the appropriate block type (to_do), and filling in the block's properties (an empty title, and checked: [["No"]]). The client builds operations to represent the creation of a new block with those attributes. New blocks are not created in isolation: blocks are also added to their parent's content array, so they are in the correct position in the content tree. As such, the client also generates an operation to do so. All these individual change operations are grouped into a transaction. Then, the client applies the operations in the transaction to its local state. New block objects are created in memory and existing blocks are modified. In native apps, the model caches all records that are accessed locally in an LRU (least recently used) cache on top of SQLite or IndexedDB, referred to as RecordCache. When records are modified on a native app, the model also updates the local copies in RecordCache. The editor re-renders to draw the newly created block onto the display. At the same time, the transaction is saved into Transaction-Queue, the part of the client responsible for sending all transactions to the model's servers so that the data is persisted and shared with collaborators. TransactionQueue stores transactions safely in IndexedDB or SQLite (depending on the platform) until they are persisted by the server or rejected.

A block can be saved on a server to be shared with others. Usually, TransactionQueue sits empty, so the transaction to create the block is sent to the server in an application programming interface (API) request. In one example, the transaction data is serialized to JSON and posted to the/saveTransactions API endpoint. SaveTransactions gets the data into source-of-truth databases, which store all block data as well as other kinds of persisted records. Once the request reaches the API server, all the blocks and parents involved in the transaction are loaded. This gives a "before" picture in memory. The block model duplicates the "before" data that had just been loaded in memory. Next, the block model applies the operations in the transaction to the new copy to create the "after" data. Then the model uses both "before" and "after" data to validate the changes for permissions and data coherency. If everything checks out, all created or changed records are committed to the database-meaning the block has now officially been created. At this point, a "success" HTTP response to the original API request is sent by the client. This confirms that the client knows the transaction was saved successfully and that it can move on to saving the next transaction in the TransactionQueue. In the background, the block model schedules additional work depending on the kind of change made for the transaction. For example, the block model can schedule version history snapshots and indexing block text for a Quick Find function. The block model also notifies MessageStore, which is a real-time updates service, about the changes that were made.

The block model provides real-time updates to, for example, almost instantaneously show new blocks to members of a teamspace. Every client can have a long-lived WebSocket connection to the MessageStore. When the client renders a block (or page, or any other kind of record), the client subscribes to changes of that record from Message-Store using the WebSocket connection. When a team member opens the same page, the member is subscribed to changes of all those blocks. After changes have been made through the saveTransactions process, the API notifies MessageStore of new recorded versions. MessageStore finds client connections subscribed to those changing records and passes on the new version through their WebSocket connection. When a team member's client receives version update notifications from MessageStore, it verifies that version of the block in its local cache. Because the versions from the notification and the local block are different, the client sends a syncRecordValues API request to the server with the list of outdated client records. The server responds with the new record data. The client uses this response data to update the local cache with the new version of the records, then re-renders the user interface to display the latest block data.

Blocks can be shared instantaneously with collaborators. In one example, a page is loaded using only local data. On the web, block data is pulled from being in memory. On native apps, loading blocks that are not in memory are loaded from the RecordCache persisted storage. However, if missing block data is needed, the data is requested from an API. The API method for loading the data for a page is referred to herein as loadPageChunk; it descends from a starting point (likely the block ID of a page block) down the content tree and returns the blocks in the content tree plus any dependent records needed to properly render those blocks. Several layers of caching for loadPageChunk are used, but in the worst case, this API might need to make multiple trips to the database as it recursively crawls down the tree to find blocks and their record dependencies. All data loaded by loadPageChunk is put into memory (and saved in the RecordCache if using the app). Once the data is in memory, the page is laid out and rendered using React.

Software Platform

FIG. 1 is a block diagram of an example platform 100. The platform 100 provides users with an all-in-one workspace for data and project management. The platform 100 can include a user application 102, an AI tool 104, and a server 106. The user application 102, the AI tool 104, and the server 106 are in communication with each other via a network.

In some implementations, the user application 102 is a cross-platform software application configured to work on several computing platforms and web browsers. The user application 102 can include a variety of templates. A template refers to a prebuilt page that a user can add to a workspace within the user application 102. The templates can be directed to a variety of functions. Exemplary templates include a docs template 108, a wikis template 110, a projects template 112, a meeting and calendar template 114, and an email template 132. In some implementations, a user can generate, save, and share customized templates with other users.

The user application 102 templates can be based on content "blocks." For example, the templates of the user application 102 include a predefined and/or pre-organized set of blocks that can be customized by the user. Blocks are content containers within a template that can include text, images, objects, tables, maps, emails, and/or other pages (e.g., nested pages or sub-pages). Blocks can be assigned to certain properties. The blocks are defined by boundaries having dimensions. The boundaries can be visible or non-visible for users. For example, a block can be assigned as a text block (e.g., a block including text content), a heading block (e.g., a block including a heading) or a sub-heading block having a specific location and style to assist in organizing a page. A block can be assigned as a list block to include content in a list format. A block can be assigned as an AI prompt block (also referred to as a "prompt block") that enables a user to provide instructions (e.g., prompts) to the AI tool 104 to perform functions. A block can also be assigned to include audio, video, or image content.

A user can add, edit, and remove content from the blocks. The user can also organize the content within a page by moving the blocks around. In some implementations, the blocks are shared (e.g., by copying and pasting) between the different templates within a workspace. For example, a block embedded within multiple templates can be configured to show edits synchronously.

The docs template 108 is a document generation and organization tool that can be used for generating a variety of documents. For example, the docs template 108 can be used to generate pages that are easy to organize, navigate, and format. The wikis template 110 is a knowledge management application having features similar to the pages generated by the docs template 108 but that can additionally be used as a database. The wikis template 110 can include, for example, tags configured to categorize pages by topic and/or include an indication of whether the provided information is verified to indicate its accuracy and reliability. The projects template 112 is a project management and note-taking software tool. The projects template 112 can allow the users, either as individuals or as teams, to plan, manage, and execute projects in a single forum. The meeting and calendar template 114 is a tool for managing tasks and timelines. In addition to traditional calendar features, the meeting and calendar template 114 can include blocks for categorizing and prioritizing scheduled tasks, generating to-do and action item lists, tracking productivity, etc. The various templates of the user application 102 can be included under a single workspace and include synchronized blocks. For example, a user can update a project deadline on the projects template 112, which can be automatically synchronized to the meeting and calendar template 114. The various templates of the user application 102 can be shared within a team, allowing multiple users to modify and update the workspace concurrently.

The email template 132 allows the users to customize their inbox by representing the inbox as a customizable database where the user can add custom columns and create custom views with layouts. One view can include multiple layouts including a calendar layout, a summary layout, and urgent information layout. Each view can include a customized structure including custom criteria, custom properties, and custom actions. The custom properties can be specific to a view such as artificial intelligence-extracted properties, and/or heuristic-based properties. The custom actions can trigger automatically when a message enters the view. The custom actions can include deterministic rules like "Archive this," or assistant workflows like responding to support messages by searching user applications 102 or filing support tickets. In addition, the view can include actions, such as buttons, that are custom to the view and perform operations on the messages in the inbox. Only the customized structure can be shared with other users of the system, or both the customized structure and the messages can be shared.

The integration of the docs template 108, the wikis template 110, the projects template 112, the meeting and calendar template 114, and the email template 132 enables linking and embedding of templates within other templates. For example, an email sent from an email address within the system 100 to another email address within the system 100, can include an embedding of a document within the system 100, or an embedding of a block in the document. In another example, a wiki can link to a meeting within the calendar.

The AI tool 104 is an integrated AI assistant that enables AI-based functions for the user application 102. In one example, the AI tool 104 is based on a neural network architecture, such as the transformer 212 described in FIG. 2. The AI tool 104 can interact with blocks embedded within the templates on a workspace of the user application 102. For example, the AI tool 104 can include a writing assistant tool 116, a knowledge management tool 118, a project management tool 120, and a meeting and scheduling tool 122. The different tools of the AI tool 104 can be interconnected and interact with different blocks and templates of the user application 102.

The writing assistant tool 116 can operate as a generative AI tool for creating content for the blocks in accordance with instructions received from a user. Creating the content can include, for example, summarizing, generating new text, or brainstorming ideas. For example, in response to a prompt received as a user input that instructs the AI to describe what the climate is like in New York, the writing assistant tool 116 can generate a block including a text that describes the climate in New York. As another example, in response to a prompt that requests ideas on how to name a pet, the writing assistant tool 116 can generate a block including a list of creative pet names. The writing assistant tool 116 can also operate to modify existing text. For example, the writing assistant can shorten, lengthen, or translate existing text, correct grammar and typographical errors, or modify the style of the text (e.g., a social media style versus a formal style).

The knowledge management tool 118 can use AI to categorize, organize, and share knowledge included in the workspace. In some implementations, the knowledge management tool 118 can operate as a question-and-answer assistant. For example, a user can provide instructions on a prompt block to ask a question. In response to receiving the question, the knowledge management tool 118 can provide an answer to the question, for example, based on information included in the wikis template 110. The project management tool 120 can provide AI support for the projects template 112. The AI support can include auto filling information based on changes within the workspace or automatically track project development. For example, the project management tool 120 can use AI for task automation, data analysis, real-time monitoring of project development, allocation of resources, and/or risk mitigation. The meeting and scheduling tool 122 can use AI to organize meeting notes, unify meeting records, list key information from meeting minutes, and/or connect meeting notes with deliverable deadlines.

The server 106 can include various units (e.g., including compute and storage units) that enable the operations of the AI tool 104 and workspaces of the user application 102. The server 106 can include an integrations unit 124, an application programming interface (API) 128, databases 126, and an administration (admin) unit 130. The databases 126 are configured to store data associated with the blocks. The data associated with the blocks can include information about the content included in the blocks, the function associated with the blocks, and/or any other information related to the blocks. The API 128 can be configured to communicate the block data between the user application 102, the AI tool 104, and the databases 126. The API 128 can also be configured to communicate with remote server systems, such as AI systems. For example, when a user performs a transaction within a block of a template of the user application 102 (e.g., in a docs template 108), the API 128 processes the transaction and saves the changes associated with the transaction to the database 126. The integrations unit 124 is a tool connecting the platform 200 with external systems and software platforms. Such external systems and platforms can include other databases (e.g., cloud storage spaces), messaging software applications, or audio or video conference applications. The administration unit 130 is configured to manage and maintain the operations and tasks of the server 106. For example, the administration unit 130 can manage user accounts, data storage, security, performance monitoring, etc.

Transformer for Neural Network

To assist in understanding the present disclosure, some concepts relevant to neural networks and machine learning (ML) are discussed herein. Generally, a neural network comprises a number of computation units (sometimes referred to as "neurons"). Each neuron receives an input value and applies a function to the input to generate an output value. The function typically includes a parameter (also referred to as a "weight") whose value is learned through the process of training. A plurality of neurons may be organized into a neural network layer (or simply "layer") and there may be multiple such layers in a neural network. The output of one layer may be provided as input to a subsequent layer. Thus, input to a neural network may be processed through a succession of layers until an output of the neural network is generated by a final layer. This is a simplistic discussion of neural networks and there may be more complex neural network designs that include feedback connections, skip connections, and/or other such possible connections between neurons and/or layers, which are not discussed in detail here.

A deep neural network (DNN) is a type of neural network having multiple layers and/or a large number of neurons. The term DNN can encompass any neural network having multiple layers, including convolutional neural networks (CNNs), recurrent neural networks (RNNs), multilayer perceptrons (MLPs), Generative Adversarial Networks (GANs), Variational Autoencoders (VAEs), and Auto-regressive Models, among others.

DNNs are often used as ML-based models for modeling complex behaviors (e.g., human language, image recognition, object classification, etc.) in order to improve the accuracy of outputs (e.g., more accurate predictions) such as, for example, as compared with models with fewer layers. In the present disclosure, the term "ML-based model" or more simply "ML model" may be understood to refer to a DNN. Training an ML model refers to a process of learning the values of the parameters (or weights) of the neurons in the layers such that the ML model is able to model the target behavior to a desired degree of accuracy. Training typically requires the use of a training dataset, which is a set of data that is relevant to the target behavior of the ML model.

As an example, to train an ML model that is intended to model human language (also referred to as a "language model"), the training dataset may be a collection of text documents, referred to as a "text corpus" (or simply referred to as a "corpus"). The corpus may represent a language domain (e.g., a single language), a subject domain (e.g., scientific papers), and/or may encompass another domain or domains, be they larger or smaller than a single language or subject domain. For example, a relatively large, multilingual, and non-subject-specific corpus can be created by extracting text from online webpages and/or publicly available social media posts. Training data can be annotated with ground truth labels (e.g., each data entry in the training dataset can be paired with a label) or may be unlabeled.

Training an ML model generally involves inputting into an ML model (e.g., an untrained ML model) training data to be processed by the ML model, processing the training data using the ML model, collecting the output generated by the ML model (e.g., based on the inputted training data), and comparing the output to a desired set of target values. If the training data is labeled, the desired target values may be, e.g., the ground truth labels of the training data. If the training data is unlabeled, the desired target value may be a reconstructed (or otherwise processed) version of the corresponding ML model input (e.g., in the case of an autoencoder), or can be a measure of some target observable effect on the environment (e.g., in the case of a reinforcement learning agent). The parameters of the ML model are updated based on a difference between the generated output value and the desired target value. For example, if the value outputted by the ML model is excessively high, the parameters may be adjusted so as to lower the output value in future training iterations. An objective function is a way to quantitatively represent how close the output value is to the target value. An objective function represents a quantity (or one or more quantities) to be optimized (e.g., minimize a loss or maximize a reward) in order to bring the output value as close to the target value as possible. The goal of training the ML model typically is to minimize a loss function or maximize a reward function.

The training data can be a subset of a larger data set. For example, a data set may be split into three mutually exclusive subsets: a training set, a validation (or cross-validation) set, and a testing set. The three subsets of data may be used sequentially during ML model training. For example, the training set may be first used to train one or more ML models, each ML model, e.g., having a particular architecture, having a particular training procedure, being describable by a set of model hyperparameters, and/or otherwise being varied from the other of the one or more ML models. The validation (or cross-validation) set may then be used as input data into the trained ML models to, e.g., measure the performance of the trained ML models and/or compare performance between them. Where hyperparameters are used, a new set of hyperparameters can be determined based on the measured performance of one or more of the trained ML models, and the first step of training (e.g., with the training set) may begin again on a different ML model described by the new set of determined hyperparameters. In this way, these steps can be repeated to produce a more performant trained ML model. Once such a trained ML model is obtained (e.g., after the hyperparameters have been adjusted to achieve a desired level of performance), a third step of collecting the output generated by the trained ML model applied to the third subset (the testing set) may begin. The output generated from the testing set may be compared with the corresponding desired target values to give a final assessment of the trained ML model's accuracy. Other segmentations of the larger data set and/or schemes for using the segments for training one or more ML models are possible.

Backpropagation is an algorithm for training an ML model. Backpropagation is used to adjust (e.g., update) the value of the parameters in the ML model, with the goal of optimizing the objective function. For example, a defined loss function is calculated by forward propagation of an input to obtain an output of the ML model and a comparison of the output value with the target value. Backpropagation calculates a gradient of the loss function with respect to the parameters of the ML model, and a gradient algorithm (e.g., gradient descent) is used to update (e.g., "learn") the parameters to reduce the loss function. Backpropagation is performed iteratively so that the loss function is converged or minimized. Other techniques for learning the parameters of the ML model can be used. The process of updating (or learning) the parameters over many iterations is referred to as training. Training may be carried out iteratively until a convergence condition is met (e.g., a predefined maximum number of iterations has been performed, or the value outputted by the ML model is sufficiently converged with the desired target value), after which the ML model is considered to be sufficiently trained. The values of the learned parameters can then be fixed and the ML model may be deployed to generate output in real-world applications (also referred to as "inference").

In some examples, a trained ML model may be fine-tuned, meaning that the values of the learned parameters may be adjusted slightly in order for the ML model to better model a specific task. Fine-tuning of an ML model typically involves further training the ML model on a number of data samples (which may be smaller in number/cardinality than those used to train the model initially) that closely target the specific task. For example, an ML model for generating natural language that has been trained generically on publicly available text corpora may be, e.g., fine-tuned by further training using specific training samples. The specific training samples can be used to generate language in a certain style or in a certain format. For example, the ML model can be trained to generate a blog post having a particular style and structure with a given topic.

Some concepts in ML-based language models are now discussed. It may be noted that, while the term "language model" has been commonly used to refer to an ML-based language model, there could exist non-ML language models. In the present disclosure, the term "language model" can refer to an ML-based language model (e.g., a language model that is implemented using a neural network or other ML architecture), unless stated otherwise. For example, unless stated otherwise, the "language model" encompasses LLMs.

A language model can use a neural network (typically a DNN) to perform natural language processing (NLP) tasks. A language model can be trained to model how words relate to each other in a textual sequence, based on probabilities. A language model may contain hundreds of thousands of learned parameters or, in the case of an LLM, can contain millions or billions of learned parameters or more. As non-limiting examples, a language model can generate text, translate text, summarize text, answer questions, write code (e.g., Python, JavaScript, or other programming languages), classify text (e.g., to identify spam emails), create content for various purposes (e.g., social media content, factual content, or marketing content), or create personalized content for a particular individual or group of individuals. Language models can also be used for chatbots (e.g., virtual assistance).

A type of neural network architecture, referred to as a "transformer," can be used for language models. For example, the Bidirectional Encoder Representations from Transformers (BERT) model, the Transformer-XL model, and the Generative Pre-trained Transformer (GPT) models are types of transformers. A transformer is a type of neural network architecture that uses self-attention mechanisms in order to generate predicted output based on input data that has some sequential meaning (i.e., the order of the input data is meaningful, which is the case for most text input). Although transformer-based language models are described herein, it should be understood that the present disclosure may be applicable to any ML-based language model, including language models based on other neural network architectures such as recurrent neural network (RNN)-based language models.

Figure 2:
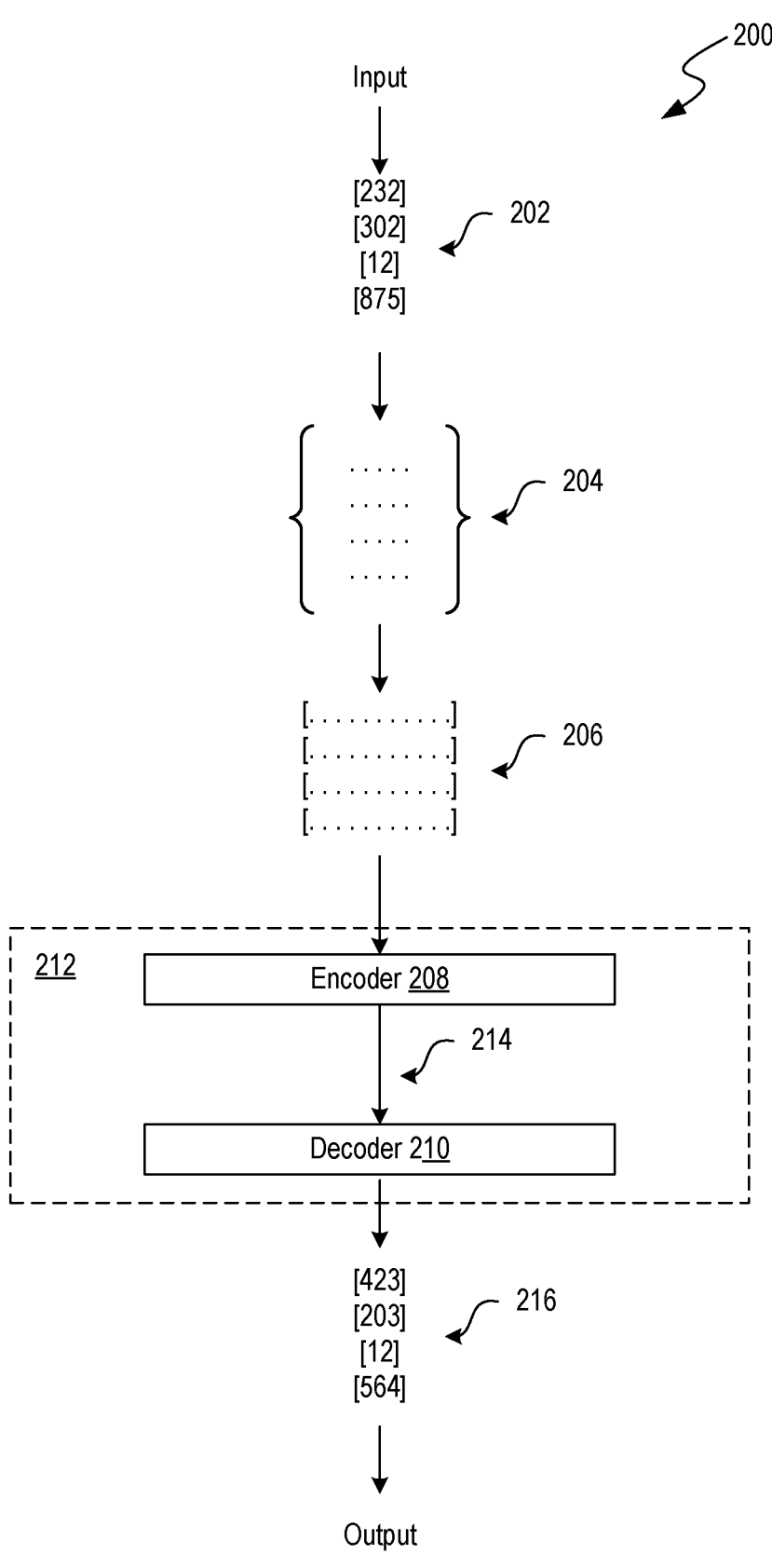
FIG. 2 is a block diagram of a transformer neural network, which may be used in examples of the present disclosure.

FIG. 2 is a block diagram of an example transformer 212. A transformer is a type of neural network architecture that uses self-attention mechanisms to generate predicted output based on input data that has some sequential meaning (e.g., the order of the input data is meaningful, which is the case for most text input). Self-attention is a mechanism that relates different positions of a single sequence to compute a representation of the same sequence. Although transformer-based language models are described herein, the present disclosure may be applicable to any ML-based language model, including language models based on other neural network architectures such as recurrent neural network (RNN)-based language models.

The transformer 212 includes an encoder 208 (which can include one or more encoder layers/blocks connected in series) and a decoder 210 (which can include one or more decoder layers/blocks connected in series). Generally, the encoder 208 and the decoder 210 each include multiple neural network layers, at least one of which can be a self-attention layer. The parameters of the neural network layers can be referred to as the parameters of the language model.

The transformer 212 can be trained to perform certain functions on a natural language input. Examples of the functions include summarizing existing content, brainstorming ideas, writing a rough draft, fixing spelling and grammar, and translating content. Summarizing can include extracting key points or themes from an existing content in a high-level summary. Brainstorming ideas can include generating a list of ideas based on provided input. For example, the ML model can generate a list of names for a startup or costumes for an upcoming party. Writing a rough draft can include generating writing in a particular style that could be useful as a starting point for the user's writing. The style can be identified as, e.g., an email, a blog post, a social media post, or a poem. Fixing spelling and grammar can include correcting errors in an existing input text. Translating can include converting an existing input text into a variety of different languages. In some implementations, the transformer 212 is trained to perform certain functions on other input formats than natural language input. For example, the input can include objects, images, audio content, or video content, or a combination thereof.

The transformer 212 can be trained on a text corpus that is labeled (e.g., annotated to indicate verbs, nouns) or unlabeled. LLMs can be trained on a large unlabeled corpus. The term "language model," as used herein, can include an ML-based language model (e.g., a language model that is implemented using a neural network or other ML architecture), unless stated otherwise. Some LLMs can be trained on a large multi-language, multi-domain corpus to enable the model to be versatile at a variety of language-based tasks such as generative tasks (e.g., generating human-like natural language responses to natural language input).

FIG. 2 illustrates an example of how the transformer 212 can process textual input data. Input to a language model (whether transformer-based or otherwise) typically is in the form of natural language that can be parsed into tokens. The term "token" in the context of language models and NLP has a different meaning from the use of the same term in other contexts such as data security. Tokenization, in the context of language models and NLP, refers to the process of parsing textual input (e.g., a character, a word, a phrase, a sentence, a paragraph) into a sequence of shorter segments that are converted to numerical representations referred to as tokens (or "compute tokens"). Typically, a token can be an integer that corresponds to the index of a text segment (e.g., a word) in a vocabulary dataset. Often, the vocabulary dataset is arranged by frequency of use. Commonly occurring text, such as punctuation, can have a lower vocabulary index in the dataset and thus be represented by a token having a smaller integer value than less commonly occurring text. Tokens frequently correspond to words, with or without white space appended. In some implementations, a token can correspond to a portion of a word.

For example, the word "greater" can be represented by a token for [great] and a second token for [er]. In another example, the text sequence "write a summary" can be parsed into the segments [write], [a], and [summary], each of which can be represented by a respective numerical token. In addition to tokens that are parsed from the textual sequence (e.g., tokens that correspond to words and punctuation), there can also be special tokens to encode non-textual information. For example, a [CLASS] token can be a special token that corresponds to a classification of the textual sequence (e.g., can classify the textual sequence as a list, a paragraph), an [EOT] token can be another special token that indicates the end of the textual sequence, other tokens can provide formatting information, etc.

In FIG. 2, a short sequence of tokens 202 corresponding to the input text is illustrated as input to the transformer 212. Tokenization of the text sequence into the tokens 202 can be performed by some pre-processing tokenization module such as, for example, a byte-pair encoding tokenizer (the "pre" referring to the tokenization occurring prior to the processing of the tokenized input by the LLM), which is not shown in FIG. 2 for brevity. In general, the token sequence that is inputted to the transformer 212 can be of any length up to a maximum length defined based on the dimensions of the transformer 212. Each token 202 in the token sequence is converted into an embedding vector 206 (also referred to as "embedding 206").

An embedding 206 is a learned numerical representation (such as, for example, a vector) of a token that captures some semantic meaning of the text segment represented by the token 202. The embedding 206 represents the text segment corresponding to the token 202 in a way such that embeddings corresponding to semantically related text are closer to each other in a vector space than embeddings corresponding to semantically unrelated text. For example, assuming that the words "write," "a," and "summary" each correspond to, respectively, a "write" token, an "a" token, and a "summary" token when tokenized, the embedding 206 corresponding to the "write" token will be closer to another embedding corresponding to the "jot down" token in the vector space as compared to the distance between the embedding 206 corresponding to the "write" token and another embedding corresponding to the "summary" token.

The vector space can be defined by the dimensions and values of the embedding vectors. Various techniques can be used to convert a token 202 to an embedding 206. For example, another trained ML model can be used to convert the token 202 into an embedding 206. In particular, another trained ML model can be used to convert the token 202 into an embedding 206 in a way that encodes additional information into the embedding 206 (e.g., a trained ML model can encode positional information about the position of the token 202 in the text sequence into the embedding 206). In some implementations, the numerical value of the token 202 can be used to look up the corresponding embedding in an embedding matrix 204, which can be learned during training of the transformer 212.

The generated embeddings 206 are input into the encoder 208. The encoder 208 serves to encode the embeddings 206 into feature vectors 214 that represent the latent features of the embeddings 206. The encoder 208 can encode positional information (i.e., information about the sequence of the input) in the feature vectors 214. The feature vectors 214 can have very high dimensionality (e.g., on the order of thousands or tens of thousands), with each element in a feature vector 214 corresponding to a respective feature. The numerical weight of each element in a feature vector 214 represents the importance of the corresponding feature. The space of all possible feature vectors 214 that can be generated by the encoder 208 can be referred to as a latent space or feature space.

Conceptually, the decoder 210 is designed to map the features represented by the feature vectors 214 into meaningful output, which can depend on the task that was assigned to the transformer 212. For example, if the transformer 212 is used for a translation task, the decoder 210 can map the feature vectors 214 into text output in a target language different from the language of the original tokens 202. Generally, in a generative language model, the decoder 210 serves to decode the feature vectors 214 into a sequence of tokens. The decoder 210 can generate output tokens 216 one by one. Each output token 216 can be fed back as input to the decoder 210 in order to generate the next output token 216. By feeding back the generated output and applying self-attention, the decoder 210 can generate a sequence of output tokens 216 that has sequential meaning (e.g., the resulting output text sequence is understandable as a sentence and obeys grammatical rules). The decoder 210 can generate output tokens 216 until a special [EOT] token (indicating the end of the text) is generated. The resulting sequence of output tokens 216 can then be converted to a text sequence in post-processing. For example, each output token 216 can be an integer number that corresponds to a vocabulary index. By looking up the text segment using the vocabulary index, the text segment corresponding to each output token 216 can be retrieved, the text segments can be concatenated together, and the final output text sequence can be obtained.

In some implementations, the input provided to the transformer 212 includes instructions to perform a function on an existing text. The output can include, for example, a modified version of the input text and instructions to modify the text. The modification can include summarizing, translating, correcting grammar or spelling, changing the style of the input text, lengthening or shortening the text, or changing the format of the text (e.g., adding bullet points or checkboxes). As an example, the input text can include meeting notes prepared by a user and the output can include a high-level summary of the meeting notes. In other examples, the input provided to the transformer includes a question or a request to generate text. The output can include a response to the question, text associated with the request, or a list of ideas associated with the request. For example, the input can include the question "What is the weather like in San Francisco?" and the output can include a description of the weather in San Francisco. As another example, the input can include a request to brainstorm names for a flower shop and the output can include a list of relevant names.

Although a general transformer architecture for a language model and its theory of operation have been described above, this is not intended to be limiting. Existing language models include language models that are based only on the encoder of the transformer or only on the decoder of the transformer. An encoder-only language model encodes the input text sequence into feature vectors that can then be further processed by a task-specific layer (e.g., a classification layer). BERT is an example of a language model that can be considered to be an encoder-only language model. A decoder-only language model accepts embeddings as input and can use auto-regression to generate an output text sequence. Transformer-XL and GPT-type models can be language models that are considered to be decoder-only language models.

Because GPT-type language models tend to have a large number of parameters, these language models can be considered LLMs. An example of a GPT-type LLM is GPT-3. GPT-3 is a type of GPT language model that has been trained (in an unsupervised manner) on a large corpus derived from documents available online to the public. GPT-3 has a very large number of learned parameters (on the order of hundreds of billions), can accept a large number of tokens as input (e.g., up to 2,048 input tokens), and is able to generate a large number of tokens as output (e.g., up to 2,048 tokens). GPT-3 has been trained as a generative model, meaning that it can process input text sequences to predictively generate a meaningful output text sequence. ChatGPT is built on top of a GPT-type LLM and has been fine-tuned with training datasets based on text-based chats (e.g., chatbot conversations). ChatGPT is designed for processing natural language, receiving chat-like inputs, and generating chat-like outputs.

A computer system can access a remote language model (e.g., a cloud-based language model), such as ChatGPT or GPT-3, via a software interface (e.g., an API). Additionally or alternatively, such a remote language model can be accessed via a network such as the Internet. In some implementations, such as, for example, potentially in the case of a cloud-based language model, a remote language model can be hosted by a computer system that can include a plurality of cooperating (e.g., cooperating via a network) computer systems that can be in, for example, a distributed arrangement. Notably, a remote language model can employ multiple processors (e.g., hardware processors such as, for example, processors of cooperating computer systems). Indeed, processing of inputs by an LLM can be computationally expensive/can involve a large number of operations (e.g., many instructions can be executed/large data structures can be accessed from memory), and providing output in a required timeframe (e.g., real time or near real time) can require the use of a plurality of processors/cooperating computing devices as discussed above.

Inputs to an LLM can be referred to as a prompt, which is a natural language input that includes instructions to the LLM to generate a desired output. A computer system can generate a prompt that is provided as input to the LLM via an API (e.g., the API 128 in FIG. 1). As described above, the prompt can optionally be processed or pre-processed into a token sequence prior to being provided as input to the LLM via its API. A prompt can include one or more examples of the desired output, which provides the LLM with additional information to enable the LLM to generate output according to the desired output. Additionally or alternatively, the examples included in a prompt can provide inputs (e.g., example inputs) corresponding to/as can be expected to result in the desired outputs provided. A one-shot prompt refers to a prompt that includes one example, and a few-shot prompt refers to a prompt that includes multiple examples. A prompt that includes no examples can be referred to as a zero-shot prompt.

Hierarchical Organizational Blocks in a Workspace

Figure 3:
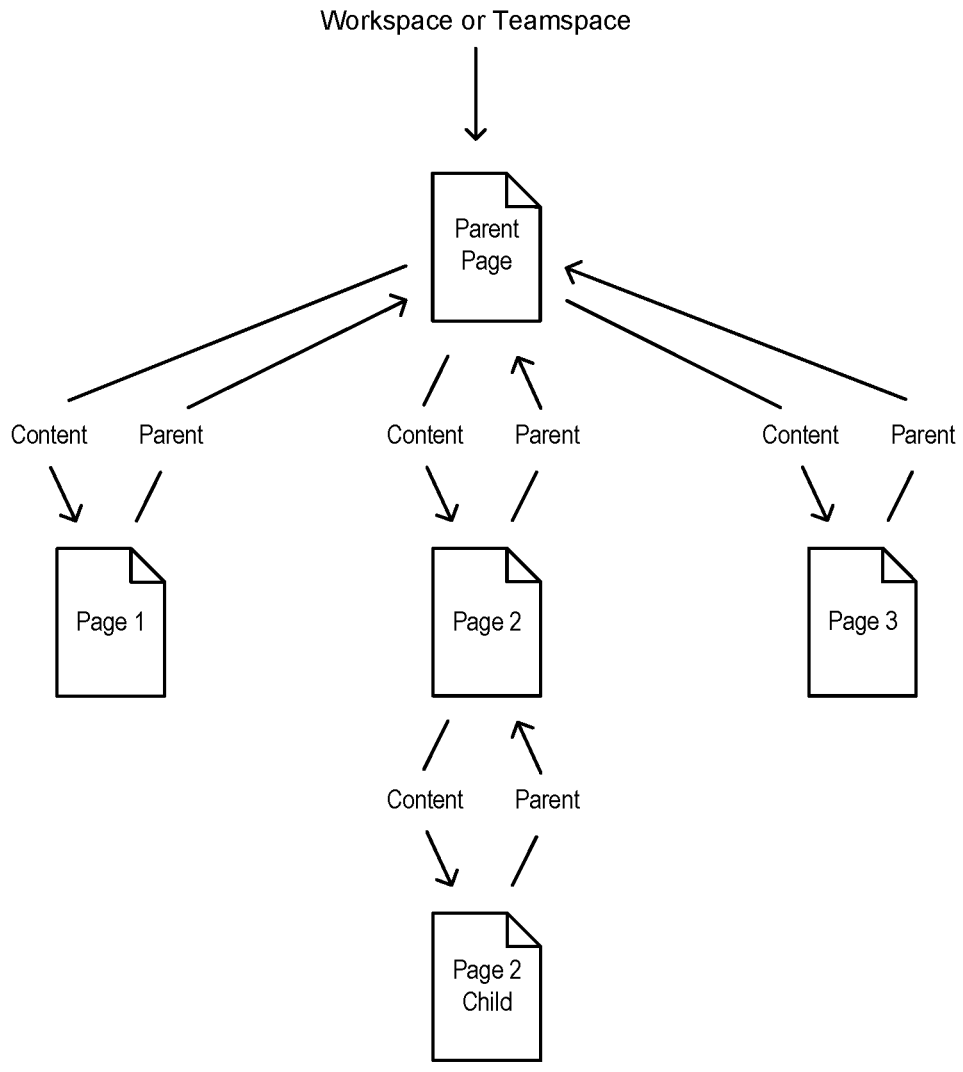
FIG. 3 is a block diagram illustrating a hierarchical organization of pages in a workspace.

FIG. 3 is a block diagram illustrating a hierarchical organization of pages in a workspace. As described with respect to the block data model of the present technology, a workspace can include multiple pages (e.g., page blocks). The pages (e.g., including parent pages and child or nested pages) can be arranged hierarchically within the workspace or one or more teamspaces, as shown in FIG. 3. The page can include a block such as tabs, lists, images, tables, etc.

A teamspace can refer to a collaborative space associated with a team or an organization that is hierarchically below a workspace. For example, a workspace can include a teamspace accessible by all users of an organization and multiple teamspaces that are accessible by users of different teams. Accessibility generally refers to creating, editing, and/or viewing content (e.g., pages) included in the workspace or the one or more teamspaces.

In the hierarchical organization illustrated in FIG. 3, a parent page (e.g., "Parent Page") is located hierarchically below the workspace or a teamspace. The parent page includes three children pages (e.g., "Page 1," "Page 2," and "Page 3"). Each of the child pages can further include subpages (e.g., "Page 2 Child," which is a grandchild of "Parent Page" and child of "Page 2"). The "Content" arrows in FIG. 3 indicate the relationship between the parents and children, while the "Parent" arrows indicate the inheritance of access permissions. The child pages inherit access permission from the (immediate) parent page under which they are located hierarchically (e.g., which is above them in the tree). For example, "Page 2" inherited the access permission of the "Parent Page" as a default when it was created under its parent page. Similarly, "Page 2 Child" inherited the access permission of the parent page as a default when it was created under its parent page. "Parent Page," "Page 2," and "Page 2 Child" thereby have the same access permission within the workspace.

The relationships and organization of the content can be modified by changing the location of the pages. For example, when a child page is moved to be under a different parent, the child page's access permission modifies to correspond to the access permission of the new parent. Also, when the access permission of "Parent Page" is modified, the access permission of "Page 1," "Page 2," and "Page 3" can be automatically modified to correspond to the access permission of "Parent Page" based on the inheritance character of access permissions.

In contrast, however, a user can modify the access permission of the children independently of their parents. For example, the user can modify the access permission of "Page 2 Child" in FIG. 3 so that it is different from the access permission of "Page 2" and "Parent Page." The access permission of "Page 2 Child" can be modified to be broader or narrower than the access permission of its parents. As an example, "Page 2 Child" can be shared on the internet, while "Page 2" is only shared internally to the users associated with the workspace. As another example, "Page 2 Child" can be shared only with an individual user, while "Page 2" is shared with a group of users (e.g., a team of the organization associated with the workspace). In some implementations, the hierarchical inheritance of the access permissions described herein can be modified from the previous description. For example, the access permissions of all the pages (parent and children) can be defined as independently changeable.

Workspace Owner Content Search

The workspace owner content search technology provides for a content search tool that enables a workspace owner to search for and review content stored in the workspace, as well as modify access permissions for the pages. The tool increases the workspace owner's ability to ensure that content is shared safely and appropriately. The technology includes a content search page that lists content entries representing pages in the workspace. The tool facilitates convenient modification of access permissions for specific pages by the workspace owner.

FIGS. 4A-4F are exemplary views of a content search interface 400 on a workspace. The content search interface 400 is associated with a workspace. The content search interface 400 can be displayed on a display of an electronic device (e.g., a computer system 900 described with respect to FIG. 9). The content search interface 400 can be associated with a workspace that includes teamspaces and/or multiple pages of a variety of types organized in a hierarchical arrangement (e.g., as described with respect to FIG. 3).

Figure 4A:
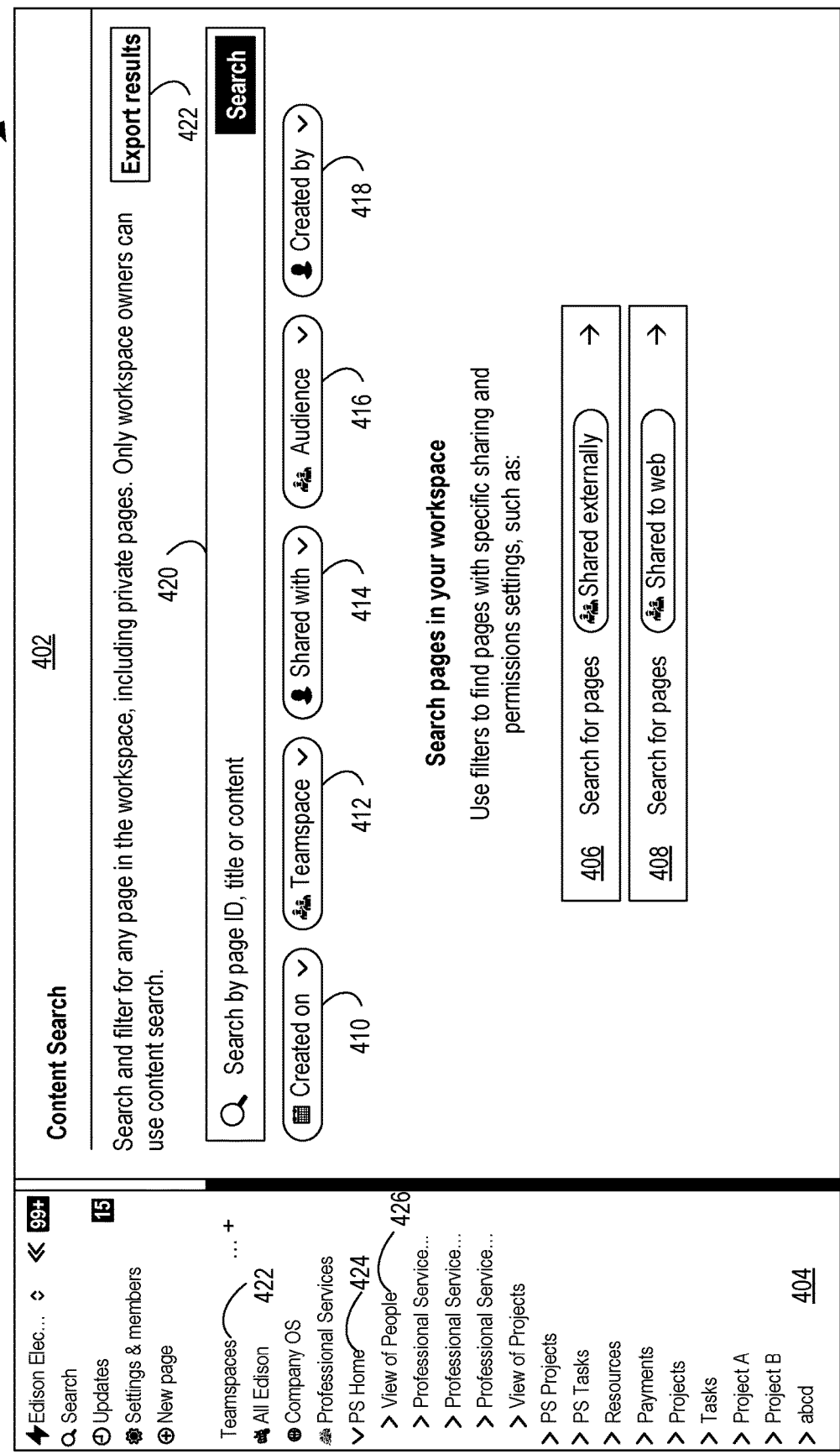
FIGS. 4A through 4F are exemplary views of a content search interface on a workspace.

The content search interface 400 in FIG. 4A includes a quick access page 402 and a sidebar 404. The sidebar 404 is an expandable navigation system. The pages of the workspace (e.g., pages 424 and 426, where page 424 can be a parent page and page 426 can be a child page) are accessible by a user input on the sidebar 404 through, for example, clickable links or control items. The sidebar 404 can also include access links to settings, trash, and other tools. A control item refers to a visual element on an interface that is associated with a particular action or interaction performed in response to receiving a user input on the control item. In some implementations, a control item is selectable so that a user can provide a user input (e.g., a click input) to select to perform the action associated with the control item. In some implementations, a control item includes a text field that allows a user to input text inside the control item. A user input (also referred to as an input) can include a click, a drag, a tap, a double click, or a combination thereof provided via a user input device or a control device (e.g., an input/output device 920 or a control device 922 in FIG. 9) when a cursor or a caret is positioned on the content search interface 400. The input can also include text input (numbers, letters, characters, etc.) or a return key input provided via a keyboard.

The quick access page 402 facilitates a convenient and efficient way for a workspace owner to review content (e.g., pages) associated with the workspace. A workspace owner refers to an administrative user associated with permission for managing user accounts and permissions of the workspace. Generally, an organization can assign one or more users (i.e., one or more workspace owners) to have the authority to review and edit pages and access permissions on a workspace associated with an organization. The quick access page 402 is particularly focused on allowing the workspace owners to review pages of the workspace in order to evaluate whether the access permissions associated with the pages are accurate. Therefore, the quick access page 402 can be made available to users who are workspace owners (e.g., their workspace account is associated with the workspace owner authority).

Each page (including parent and child pages) of the workspace is associated with an access permission. The access permission defines a group of users (e.g., one or more users) that have a permission to access the page. Accessing the page can include reviewing the content included on the page (e.g., a partial permission) or, in addition to reviewing, modifying the content included on the page or modifying the access permission of the page (e.g., a full permission). In some implementations, a user can have a permission to create, view, and edit content but not to delete it. The access permission is included in the metadata associated with each of the pages. Management of the access permissions associated with pages of the workspace is important for operating the workspace efficiently and securely. A workspace owner can, for example, ensure that a page of the workspace is shared with the appropriate group of users. Specifically, the workspace owner can modify the permissions to forgo sharing the content of the workspace to a too-broad audience (e.g., when a confidential page is shared with users outside the organization).

The quick access page 402 can include a quick access control item 406 for displaying content of the workspace that is shared outside the workspace and a quick access control item 408 for displaying content of the workspace shared on the internet. These two categories of permission levels represent the categories that are most useful for a workspace owner to review the content of the workspace to ensure that it is not shared with a too-broad audience. In response to a user input on the quick access control items 406, the content search interface 400 can display a content search page (e.g., the content search page 428 in FIG. 4B) that includes entries for all pages of the workspace that have been shared to one or more users who are outside the organization associated with the workspace. For example, when a link to a page has been emailed to a designated user (also called a guest user) that is outside the organization, and that designated user has a permission to access the page using that link, such page can be considered to be shared externally. Externally shared content, however, excludes herein content that is shared on the internet to a broad audience. In response to a user input on the quick access control items 408, the content search interface 400 can display a content search page that includes entries for all pages of the workspace that have been shared on the internet.

In some implementations, the quick access page 402 further includes filtering control items that allow the workspace owner to filter (e.g., to select or separate based on predetermined criteria, conditions, or rules) entries associated with pages. For example, a filtering control item 410 is for filtering data entries in accordance with a date or a date range when the data is created, a filtering control item 412 is for filtering data entries in accordance with a teamspace they are associated with, a filtering control item 414 is for filtering data entries in accordance with users having an access permission to the page (e.g., all pages that a particular user has access to), a filtering control item 416 is for filtering data entries in accordance with the audience that has an access permission to the page, and a filtering control item 418 is for filtering data entries in accordance with a user who has created the page. The filtering control items can be implemented individually or jointly (e.g., by activating two or more of the control items). For example, the workspace owner can search for data entries created on a particular day by a particular user by user inputs on the filtering control items 410 and 418, respectively.

In some implementations, the quick access page 402 further includes a search bar 420 (e.g., a search bar control item) that allows the workspace owner to filter the data entries in accordance with a keyword or a key phrase. The workspace owner can use the search bar together with the one or more filtering control items. The workspace owner can search for pages based on any information that is included in the name or metadata associated with the page. In some implementations, the quick access export data entries (e.g., search results) from the content search interface 400 to an external document (e.g., in a comma-separated value (CSV) format).

Figure 4B:
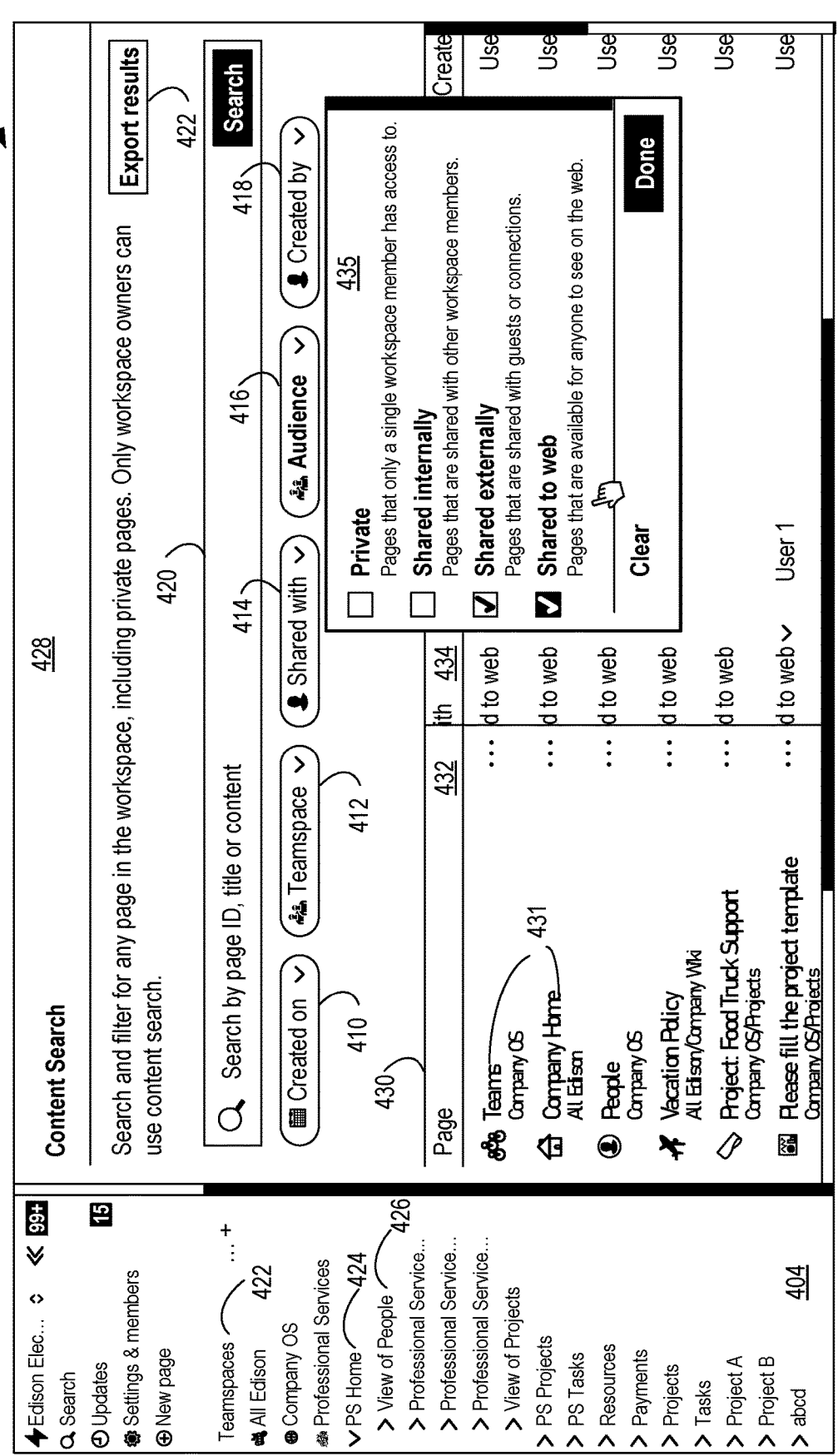

In response to a user input on the quick access control item 406 or 408, the content search interface 400 can display the results of the search on a content search page 428, as shown in FIG. 4B. The results can be included in a list 430 (e.g., in a table format). The list 430 can include multiple content entries (e.g., entries 431) associated with respective pages of the workspace that satisfy the given criteria (e.g., criteria defined by either of the quick access control items 406 or 408, the search bar 420, and/or the filtering control items 410, 412, 414, 416, and 418). The list 430 includes a title of the page (e.g., titles 432 such as "Teams" and "Company name") as well as other metadata (e.g., metadata 434). The metadata 434 can include, for example, creator of a page, date of creating and/or modifying the page, page type (e.g., a child or a parent), location of the page in the hierarchical organization of pages (e.g., as described with respect to FIG. 3), access permission associated with the page, file type, file size, version information, keywords, key phrases, or tags associated with the page, document identifier, language, location information (e.g., a Uniform Resource Locator (URL)) associated with the page, etc.

By providing a user input on any of the filtering control items 410 through 418 and/or the search bar 420, the workspace owner can provide further criteria for selecting which content entries to be displayed in the list 430. As shown, in response to a user input on the filtering control item 416, the content search page 428 can provide a drop-down menu 435 that includes multiple selectable control items associated with different levels of access permission. The levels of access permission include, for example, a private level, a workspace sharing level, an external sharing level, and an internet sharing level. A user can select one or more of the access permission levels. For example, in FIG. 4B, the user has clicked on the "Shared externally" control item and the "Shared to web" control item on the dropdown menu 435 to select these levels. The workspace owner can modify the content entries included on the list 430 by user inputs on the search bar 420 and/or the filtering control items 410, 412, 414, 416, and 418.

Figure 4C:
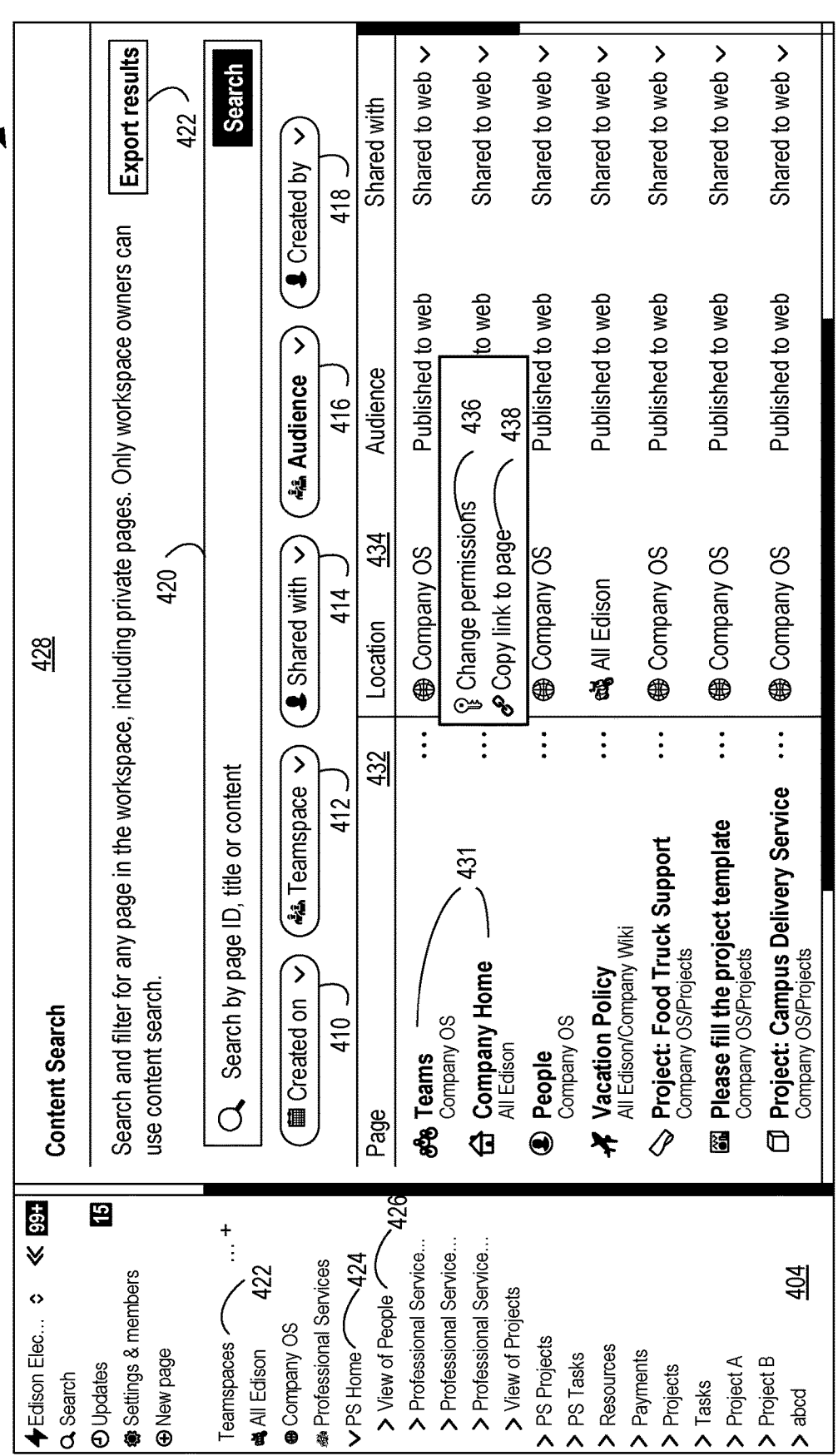

Due to the authority associated with the workspace owner, the workspace owner can view entries (e.g., the title and metadata) associated with all pages of the workspace. The content entries 431 included on the list 430 can therefore include entries that are associated with pages that the workspace owner has a permission to access or does not have permission to access. A user who is not a workspace owner would not be allowed to view such content entries that the user does not have permission to access. The workspace owner further has a permission to modify the access permission of a page. In FIG. 4C, in response to a user input on the content entry 431 "Company Home," the content search page 428 provides (e.g., in a pop-up window) a permission change control item 436 and a link copying control item 438. In response to a user input on the permission change control item 436, the content search interface 400 can display a permission change page (e.g., a permission modification page 446 in FIG. 4E).

In response to a user input on the link copying control item 438, the content search interface 400 can display either the page associated with the link or a permission change page (e.g., a no-access indication page 440 in FIG. 4D) depending on whether the workspace owner has a permission to access the page. Specifically, in an instance that the workspace owner has a permission to access the page associated with the content entry 431 "Company Home," the content search interface 400 can display the page based on the link. However, in an instance that the workspace owner does not have a permission to access the page, the content search interface 400 can display the no-access indication page 440 shown in FIG. 4D.

The no-access indication page 440 can include a notification 448 that indicates that the workspace owner does not have access to the page ("No access to Private Page").

Alternatively, the name of the page can be shown even if the workspace owner does not have access to the page. The no-access indication page 440 further includes a control item 444 for requesting access to the page. In response to a user input on the control item 444, the system can send a creator or a manager of the page a notification (e.g., an email or a message) that the workspace owner is requesting to access the page. The creator or the manager of the page can then approve or disapprove the request. The no-access indication page 440 further includes the permission change control item 436, also shown in FIG. 4C, for changing the permission to access the page. In response to a user input on the permission change control item 436, the content search interface 400 can display the permission modification page 446 in FIG. 4E. The no-access indication page 440 in FIG. 4D also includes a return control item 442 ("Back to my content") that allows the user to, for example, return to the content search page 428 in FIG. 4C.

Figure 4D:
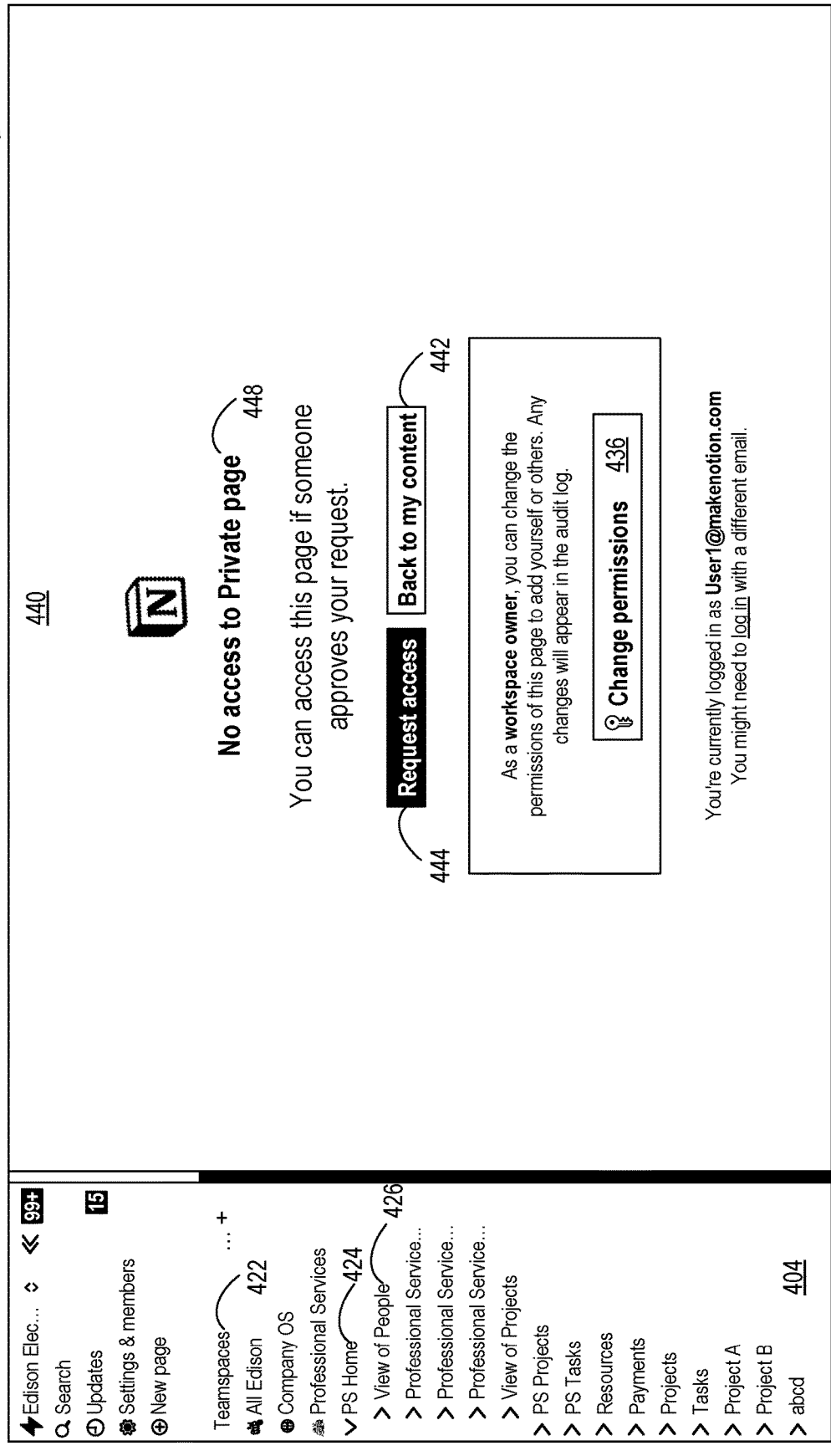
Figure 4E:
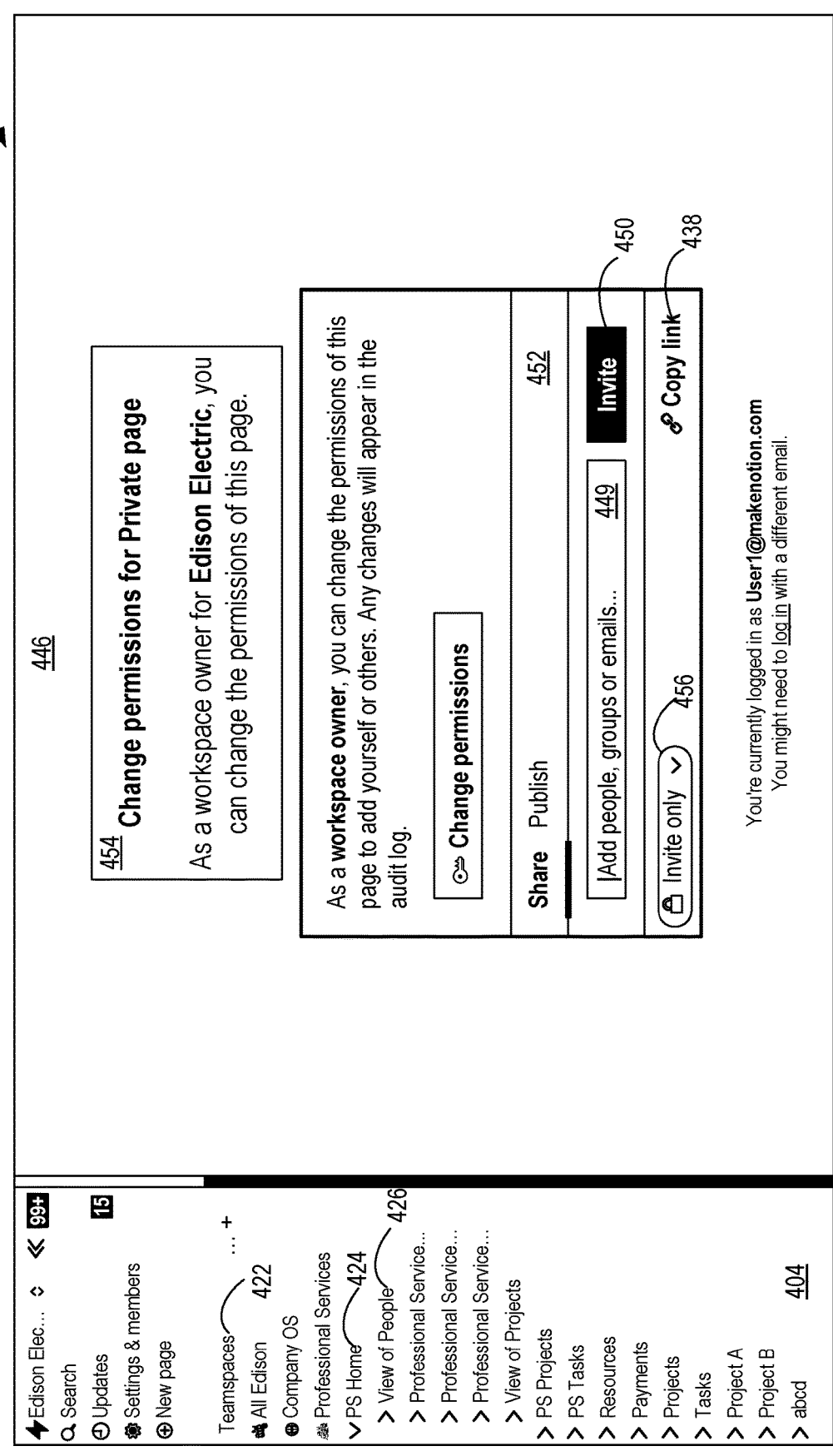

FIG. 4E shows the permission modification page 446 that can be displayed in response to a user input on the permission change control item 436 in FIG. 4C or FIG. 4D. The permission modification page 446 can include a notification 454 to indicate that the workspace owner can modify the access permissions of the associated page. The access permission modification can be done by selecting a tab on the tab bar 452 to either share the page with a group of one or more people or publish the page (or a link to the page), for example, on the internet. Under the share tab, the workspace owner can add individual users or groups of users by adding their identification (e.g., a username, email address, a group name, or a group email address) on a control item 449 and sending an invitation to the individual users or groups of users by a user input on the invitation control item 450. The workspace owner can also select users from a list by a user input on a control item 456. The workspace owner can also copy the link to the page by a user input on the link copying control item 438 (e.g., as described with respect to FIG. 4C). Alternatively, the workspace user can remove users from the access permission using the same control items as described with respect to the permission modification page 446.

In some implementations, in response to a modification of the access permission, a notification (e.g., an email or a message) of the modification is sent automatically by the computer system to other workspace owners associated with the workspace. The modification will also be entered into an audit log associated with the page. The audit log can be accessible by, for example, the creator of the page, who can review any access permission modification from the audit log.

Figure 4F:
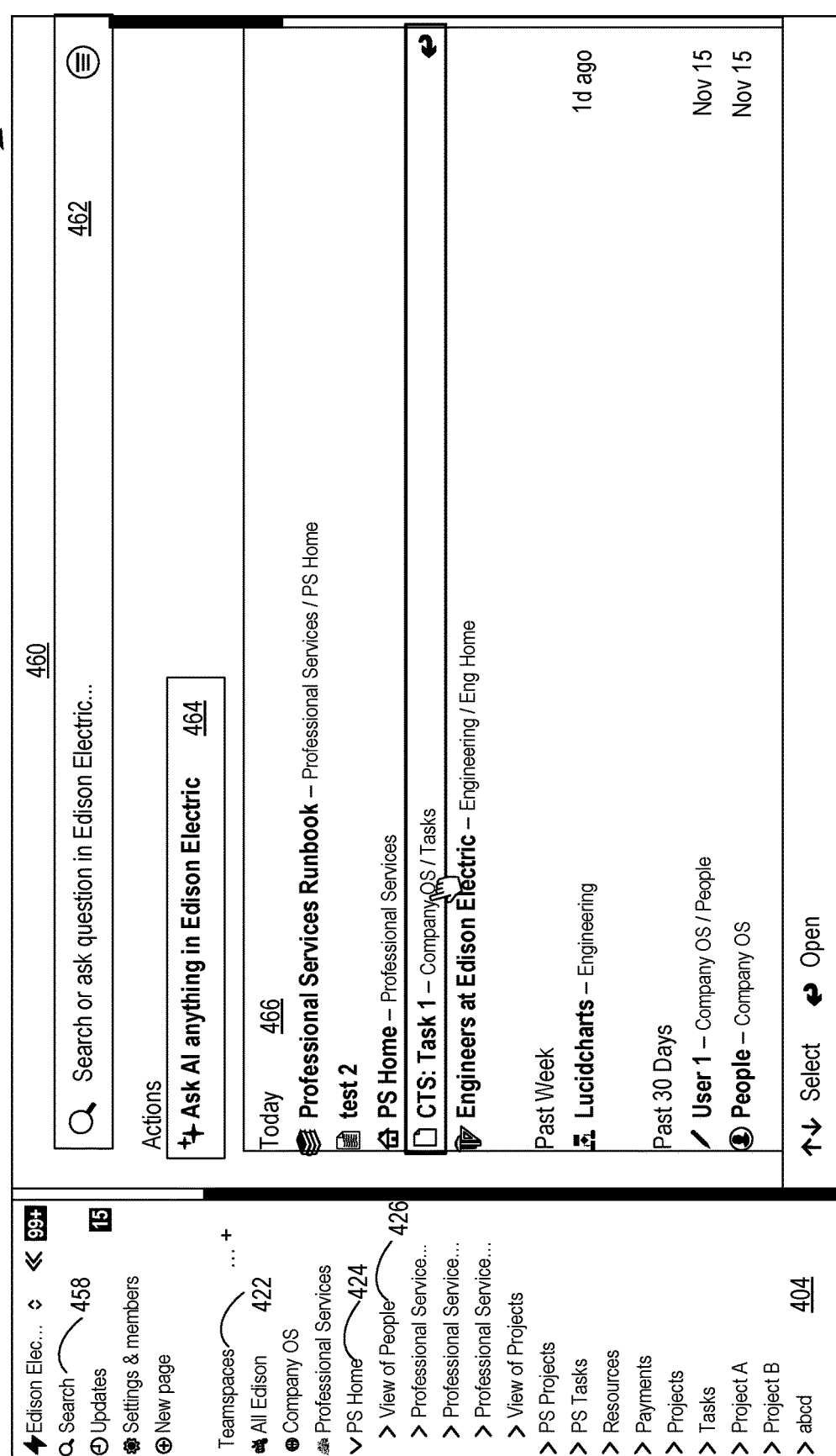

FIG. 4F shows a content search page 460, which is different from the content search page 428 in that it allows a user (e.g., the workspace owner) to only search for and view content entries for pages that the user has a permission to access. The permission to access can include partial (e.g., an access to view but not to edit) and/or full access (e.g., an access to view and edit). The content search page 460 allows a user to search for content based on the title and metadata associated with pages, as described with respect to the content search page 428. However, a search performed by the workspace owner on the content search page 428 can provide a larger list of content entries than a similar search performed on the content search page 460. The content search page 460 can be accessed by a user input on a control item 458 (or a link) in the sidebar 404. The content search page 460 includes a search bar 462 that corresponds to the search bar 420 described with respect to FIG. 4B. The content search page 460 can further include an AI-based search bar 464 that can apply the LLM described with respect to FIG. 2 to search for content of the workspace or answer questions based on the content of the workspace. The content search page 460 further includes a search history 466 that can include indications for searches that the user has performed in the past (e.g., the same day, during the past day, or during the past 30 days).

Figure 5:
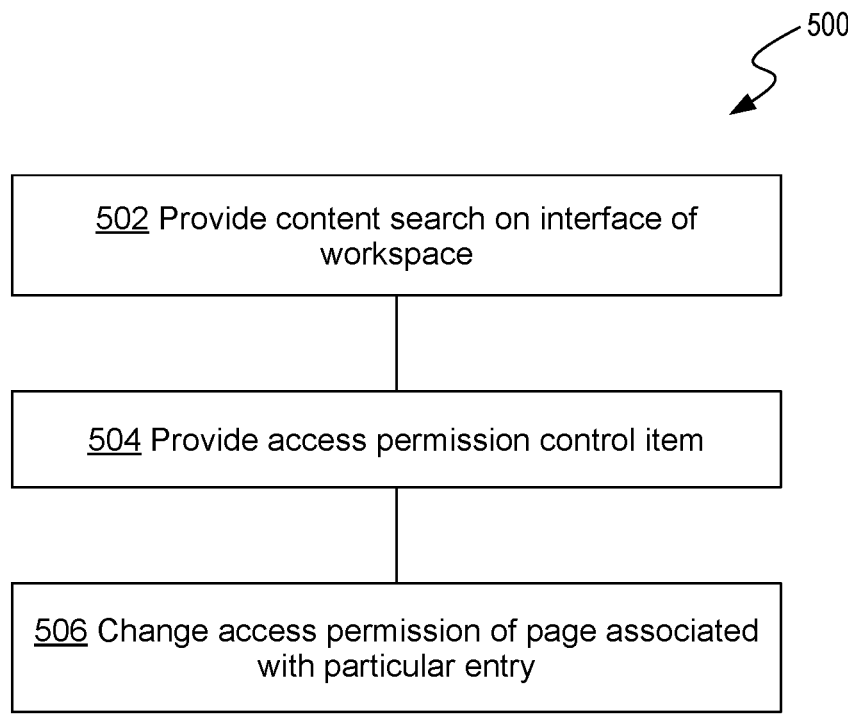
FIG. 5 is a flow diagram illustrating processes for providing a content search on an interface of the workspace.

FIG. 5 is a flow diagram illustrating processes 500 for providing a content search on an interface of the workspace. The processes 500 can be performed by a system (e.g., the computer system 900 described with respect to FIG. 9). The processes 500 can include displaying a graphical user interface such as content search interface 400 described with respect to FIGS. 4A-4F, which is associated with a workspace.

At 502, the system can provide a content list on a content search page (e.g., the list 430 on the content search page 428 in FIG. 4B) presented on the interface of the workspace. The content list can include multiple content entries (e.g., the entries 431). Each content entry of the multiple content entries can include a title and metadata (e.g., the titles 432 and metadata 434) associated with a respective page of the multiple pages of the workspace. In some implementations, the metadata includes a location, a group space, a creator, and an access permission level associated with each of the multiple pages.

A page of the multiple pages can be associated with an access permission defining users' permissions to access the page. The content list can include content entries associated with pages that a user viewing the content search page does not have an access permission to access. For example, the system allows only a workspace owner having the authority from the associated organization to review all pages of the workspace and modify permissions to the pages to search and review the pages of the content search page 428 in FIG. 4B.

At 502, in response to a user input on a particular content entry on the content list, the system can provide an access permission control item for changing the access permission to access the page associated with the particular content entry. For example, in FIG. 4C, the workspace owner has provided a user input on the entry 431 titled "Company home." In response to the user input, the content search interface 400 displays the permission change control item 436, which can allow the workspace owner to modify the access permission of the "Company home" page. The access permission control item can indicate that the user does not have access to view the content of the page. For example, the content search interface 400 in FIG. 4D includes the notification 448 indicating that the workspace user does not have access to view the page. Such a notification can be displayed in response to the workspace owner attempting to view the page through a link or initiating to modify the access permission associated with the page.

At 504, in response to a user input on the access permission control item, the system can modify the access permission of the page associated with the particular content entry even though the user requesting the modification associated with the access permission does not have access to view the content of the page. For example, the content search interface 400 can display the permission modification page 446 shown in FIG. 4E in response to a user input on the permission change control item 436. Changing the access permission can include adding or removing users from a group of one or more users who have the access permission to access the page. For example, in FIG. 4A, the workspace owner can add or remove people by writing a user input on the control item 449.

In some implementations, workspace owners associated with a workspace can have permissions to modify the access permission so that they can define whether a user can delete a page or edit the content on the page. For example, the workspace owner can modify the access permission so that no user has a permission to delete the page. Such implementations can be useful, for example, in instances of digital investigations for evidence stored in the workspace (e.g., e-discovery).

In some implementations, the multiple pages include parent pages and child pages that are hierarchically organized within the workspace (e.g., as shown in FIG. 3). The child page can be a subpage of a parent page of the multiple pages. For example, the multiple pages of the workspace include pages of different hierarchical levels within the workspace. The different hierarchical levels within the workspace can be organized to include the workspace, one or more teamspaces that are located under the workspace, parent pages (e.g., "Parent Page" in FIG. 3) that are located respectively under the workspace or the one or more teamspaces, and child pages (e.g., "Page 1," "Page 2," and "Page 3") that are located under their respective parent pages. For example, the child page can inherit an access permission of the parent page at a time when the child page is generated. For example, "Page 2" can inherit the access permission of the "Parent Page" as a default when "Page 2" is created in FIG. 3. Similarly, "Page 2 Child" inherits the access permission of "Page 2" as a default when it is created. The parent pages can inherit the access permission of the respective workspace or the respective one or more teamspaces. The access permission inheritance is indicated in FIG. 3 with "Parent" arrows. The child can inherit the access permission of the respective pages. The access permission of any of the one or more teamspaces, parent pages, and child pages can be configured to be independently changeable.

In an instance that the particular content entry (e.g., the content entry 431 titled "Company home" in FIG. 4C corresponds to a child page such as "Page 2 Child" in FIG. 3) is associated with a child page, in response to receiving the user input on the particular content entry to modify the access permission of the particular page, the system can modify the access permission to the child page so that the access permission of the child page is different from the access permission of the respective parent page. For example, the workspace owner can modify the access permission of "Page 2 Child" in FIG. 3 so that it is different from the access permission of "Page 2" and "Parent Page." The access permission of "Page 2 Child" can be modified to be broader or narrower than the access permission of its parents. For example, "Page 2 Child" can be shared on internet while "Page 2" is only shared internally to the users associated with the workspace. As another example, "Page 2 Child" can be shared only with an individual user while "Page 2" is shared with a group of users (e.g., a team of the organization associated with the workspace).

In some implementations, in an instance that the particular content entry is associated with a parent page and in response to receiving the user input on the particular content entry to modify the access permission of the particular page, the system modifies the access permission to the parent page and to any child pages associated with the parent page. As explained with respect to FIG. 3, the child pages inherit the access permission of their parents as a default (e.g., as shown by the "Parent" arrows in FIG. 3). When the access permission of "Parent Page" is modified, the access permission of "Page 1," "Page 2," and "Page 3" is automatically modified to correspond to the access permission of "Parent Page." Similarly, if a child page is moved to be located under a different page, the access permission of the child page will modify to correspond to the access permission of the new parent page.

In some implementations, in response to the user input on the access permission control item for changing the access permission, the system provides a window including a permission request control item for requesting access permission to the particular page and a permission change control item for changing the permission of the particular page (e.g., the permission change control item 436 and the link copying control item 438 are displayed in a pop-up window in FIG. 4C).

In some implementations, the system provides multiple filtering control items on the content search page presented on the interface. Each of the multiple filtering control items can be associated with a feature of metadata associated with the multiple pages. Each of the multiple filtering control items can be selectable to provide a sub-list of the content list that includes those content entries that are associated with the respective feature of the metadata. For example, FIGS. 4A-4C include a filtering control item 410 for filtering data entries in accordance with a date or a date range when the data is created, a filtering control item 412 for filtering data entries in accordance with a teamspace they are associated with, a filtering control item 414 for filtering data entries in accordance with users having an access permission to the page (e.g., all pages that a particular user has access to), a filtering control item 416 for filtering data entries in accordance with the audience that has an access permission to the page, and a filtering control item 418 for filtering data entries in accordance with a user who has created the page.

In some implementations, the system provides a sidebar section (e.g., the sidebar 404 in FIGS. 4A-4F). The sidebar section can include a control item for an additional content search (e.g., the control item 458 in FIG. 4F). In response to a user input on the control item for the additional content search, the system can provide an additional content list of content entries on an additional content search page that is different from the content search page. Each content entry on the additional content list can be associated with a respective page of the multiple pages that the user viewing the workspace has an access permission for. The content search page 460 shown in FIG. 4F is different from the content search page 428 in FIG. 4B in that it allows a user (e.g., the workspace owner) to only search for and view content entries for pages that the user has a permission to access. For example, the system is configured to determine the authority of the user who is attempting to access the different content search pages. The determination can be done based on the user's account information (e.g., is the user a workspace owner associated with the organization or not). The content search page 460 can allow a user to search for content based on the title and metadata associated with pages, as described with respect to the content search page 428. However, a search performed by the workspace owner on the content search page 428 provides a larger list of content entries than a similar search performed on the content search page 460 because the user will only see the content entries that they have a permission to access.

In some implementations, in response to the user input on the particular content entry on the content list, the system provides a link to the page associated with the particular content entry (e.g., user input on the link copying control item 438 in FIG. 4C). Prior to opening the page associated with the link so that the user can view the page associated with the particular content entry, the system can provide the access permission control item (e.g., the permission change control item 436 in FIG. 4D) for changing the permission to access the page associated with the particular content entry.

In some implementations, the system provides a filtering control item (e.g., the filtering control item 418 in FIG. 4B) on the content search page presented on the interface. The filtering control item can be for filtering the content list based on levels of access permission (e.g., as listed on the drop-down menu 435). The levels of access permission can include a private level, a workspace sharing level, an external sharing level, and an internet sharing level.

In some implementations, in response to receiving a user input to modify the permission to access the page from the user, the system adds an indication of the modification in the permission to access the page to an action log associated with the page. An action log can refer to a record that tracks and documents actions or activities related to pages of the workspace. The action log can, for example, include a chronological history of events, changes, or transactions within a digital environment. The action log can be accessible by the creator of the page and/or one or more workspace owners of the page. In some implementations, the system can provide a notification of the modification in the permission to access the page to a group of users (e.g., a group of one or more workspace owners) of the workspace having the authority to modify the access permission to the page. The notification can be an email or a message provided via the workspace or a messaging system.

Quick Access Content Search

FIG. 6 is a flow diagram illustrating processes 600 for providing a quick access content search page on an interface of the workspace. The processes 600 can be performed by a system (e.g., the computer system 900 described with respect to FIG. 9). The processes 600 can include displaying a graphical user interface such as the content search interface 400 described with respect to FIGS. 4A-4F, which is associated with a workspace.

At 602, a system provides a quick access content search page presented on an interface of a workspace. For example, the content search interface 400 in FIG. 4A includes the quick access page 402 that provides an effective manner for a workspace owner to review content entries of the workspace that have been shared outside the workspace user community.

The quick access content search page can include a control item for filtering pages of the workspace based on external sharing and a control item for filtering pages of the workspace based on internet sharing. For example, the quick access page 402 includes the quick access control item 406 for displaying content of the workspace that is shared outside the workspace and the quick access control item 408 for displaying content of the workspace shared on the internet. The multiple pages can include parent pages and child pages are hierarchically organized within the workspace (e.g., as described with respect to FIG. 3). A child page can be a subpage of a parent page of the multiple pages. The child page can inherit an access permission of the parent page at a time when the child page is generated.

The access permission can correspond to the external sharing or the internet sharing. External sharing can refer to an access permission that allows a designated user that is not a user of the workspace to access the page. For example, when a link to a page has been emailed to a designated user, also called a guest user, that is outside the organization, and that designated user has a permission to access the page using that link, the page can be considered to be shared externally. The externally shared content can include content that is shared with a third party organization. For example, pages of the workspace could be shared with outside organizations that can then access the content (e.g., to copy, export, or share the content). Such an outside organization can be, for example, a collaborator or a vendor (e.g., a search engine, a search application, or an AI application). Externally shared content, however, can exclude content that is shared on the internet to a broad audience (e.g., to non-designated users). Sharing content on the internet can include, for example, publishing a link to the content on a website that allows anyone to access the content via that link.

At 604, in response to a user input on the control item for filtering content based on the external sharing, the system can provide a list of content entries of pages that have been shared outside the workspace. At 606, in response to a user input on the control item for filtering content based on internet sharing, the system can provide a list of content entries of pages that have been shared on the internet. The list 430 in FIG. 4B is an exemplary list including content entries 431 associated with pages of the workspace. The content entries 431 in the list 430 depend on the filtering associated with the content search by the user's input.

Each content entry on the list of content entries of pages that have been shared outside the workspace and the list of content entries of pages that have been shared on the internet can include a title (e.g., the titles 432) and metadata (e.g., the metadata 434) associated with a respective page. The metadata can indicate an access permission defining users' permissions to access the associated page.

The list of content entries of pages that have been shared outside the workspace and the list of content entries of pages that have been shared on the internet can include content entries associated with pages that a user viewing the content search page does not have an access permission to access. The content quick access page 402 and the content search page 428 in FIGS. 4A and 4B are only accessible by the workspace owners of the workspace. The workspace owners are associated with the authority to review content on the workspace that is beyond the content that they have permissions to access. Therefore, the content quick access page 402 and the content search page 428 can display content entries associated with all the pages of the workspace, regardless of whether the workspace owner has permissions to access them. In contrast, a user who is not a workspace owner can only see content entries associated with pages that they are permitted to access.

In some implementations, in response to a user input on a particular content entry on the list of content entries of pages that have been shared outside the workspace or the list of content entries of pages that have been shared on the internet, the system provides an access permission control item for changing the permission to access the page (e.g., the permission change control item 436 in FIG. 4C) associated with the particular content entry. The access permission control item can indicate that the user does not have access to view the content of the page (e.g., a notification 448 in FIG. 4D). In response to a user input on the access permission control item, the system can modify the access permission of the page associated with the particular content entry even though the user requesting the modification associated with the access permission does not have access to view the content of the page. Changing the access permission includes adding or removing users from a group of users who have the access permission to access the page (e.g., by using the control item 449 in FIG. 4E).

In some implementations, in an instance that the particular content entry is associated with a child page, in response to receiving the user input on the particular content entry to modify the access permission of the particular page, the system modifies the access permission to the child page so that the access permission of the child page is different from the access permission of the respective parent page (e.g., as described with respect to FIG. 3). In some implementations, in an instance that the particular content entry is associated with a parent page, in response to receiving the user input on the particular content entry to modify the access permission of the particular page, the system can modify the access permission to the parent page and to any child pages associated with the parent page.

In some implementations, in response to a user input on the particular content entry on the list of content entries of pages that have been shared on the internet, the system provides an access permission control item for changing the access permission to access the page associated with the particular content entry. Changing the access permission of the page includes reducing the group of users who have access permission to access the page. For example, the workspace owner can deny accessing the document by non-designated users who attempt to access the page via a link shared on the internet. Denying the access can include, for example, changing the access permissions settings so that only users who are invited to access the page can access the page (e.g., using control item 449 or 456)

In some implementations, in response to receiving the user input to modify the permission to access the page from the user, the system adds an indication of the modification in the permission to access the page to an action log associated with the page. The action log can be accessible by the creator of the page. The system can provide a notification of the modification in the permission to access the page to a group of users of the workspace. The group of users can have the authority to modify the access permission to the page.

In some implementations, the system provides additional filtering control items (e.g., the filtering control items 410, 412, 414, 416, and 418 in FIG. 4C) on the quick access content search page presented on the interface. Each of the additional filtering control items can be associated with a feature of the metadata (e.g., the metadata 434 in FIG. 4C). Each of the multiple filtering control items can be selectable to provide a content list that includes content entries that are associated with the respective feature of the metadata.

Analytics Search

Figure 7A:
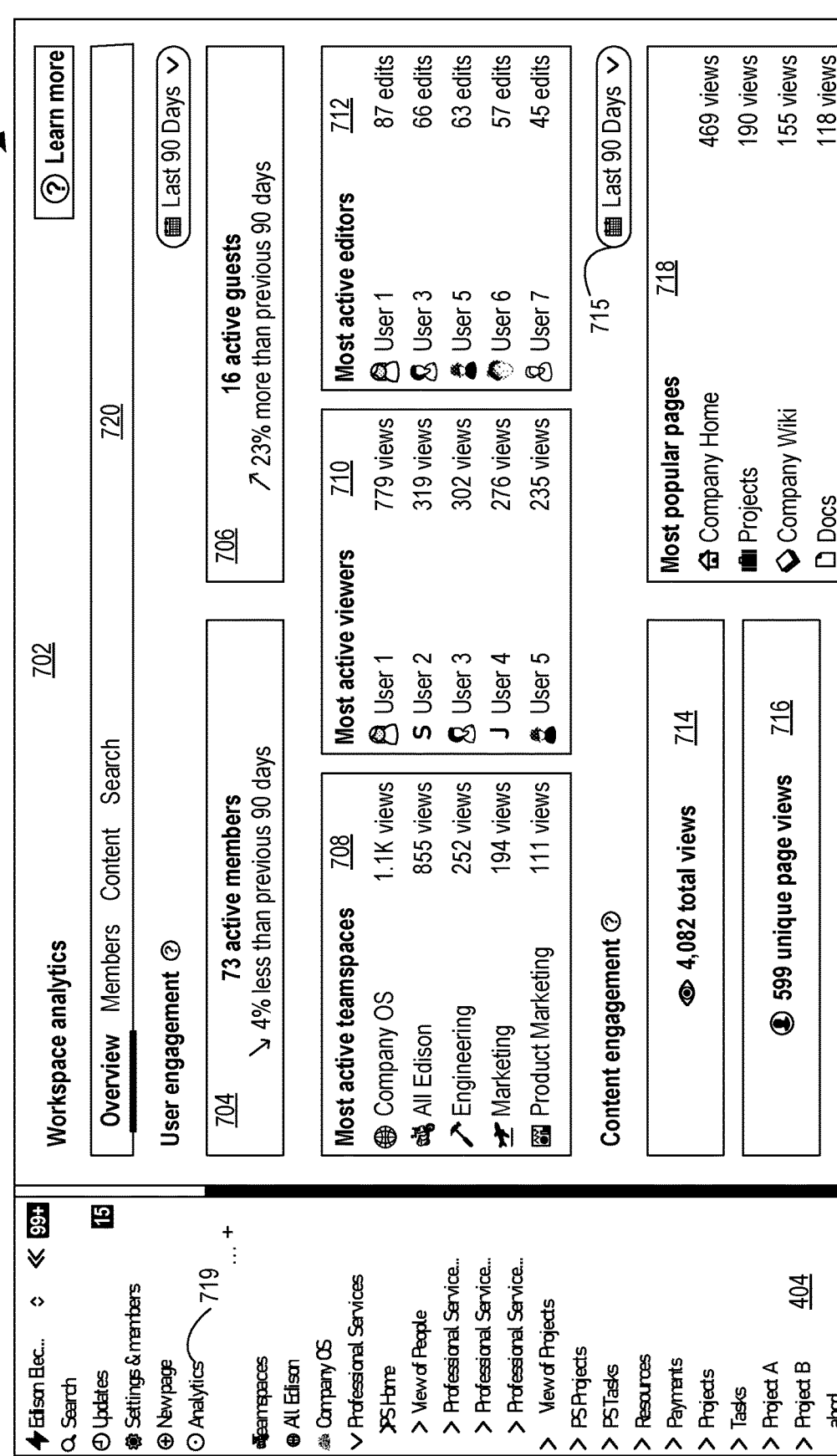
FIGS. 7A and 7B are exemplary views of an analytics search on a workspace.
Figure 7B:
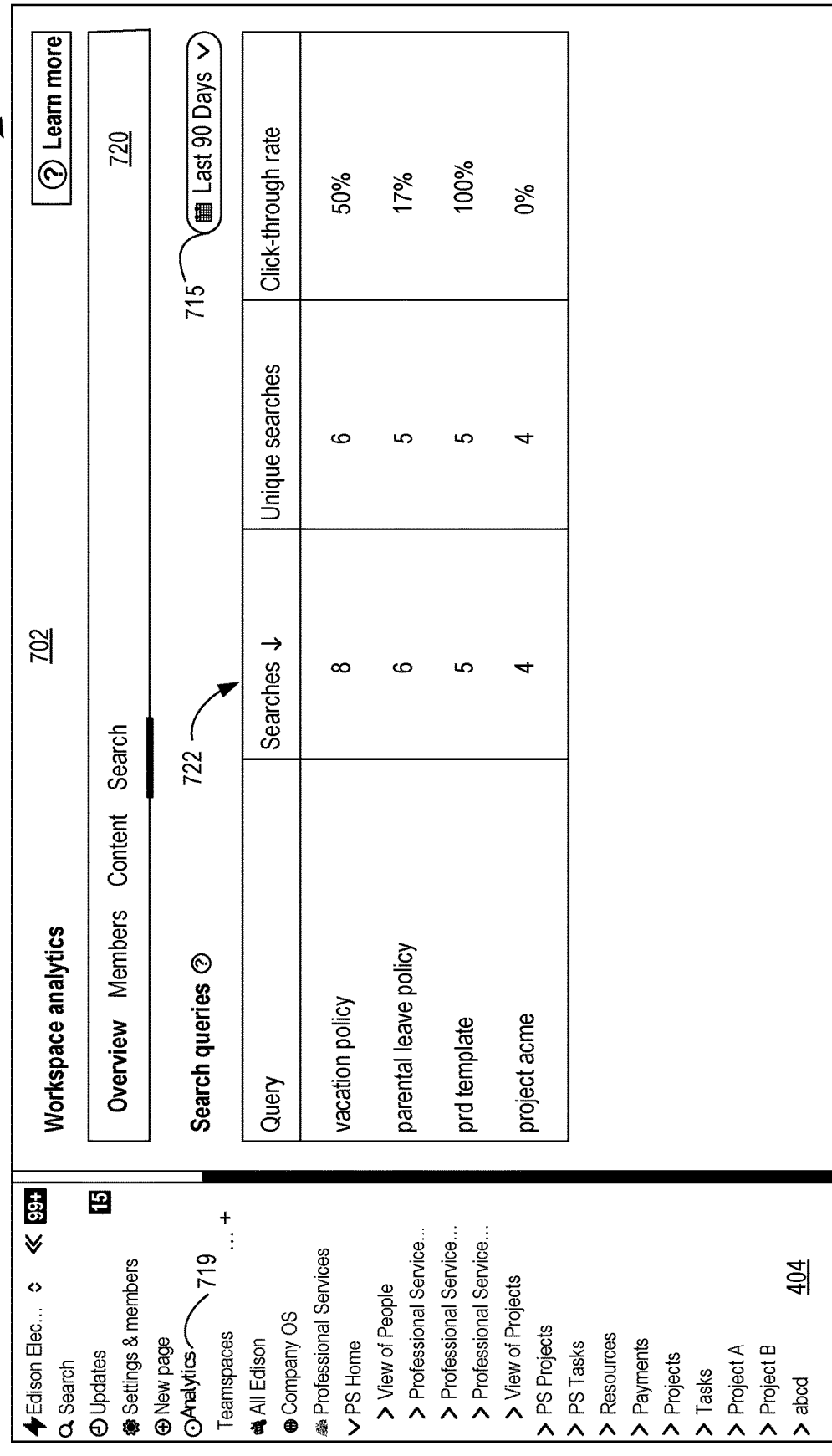

FIGS. 7A and 7B are exemplary views of an analytics search interface 700 on a workspace. The analytics search interface 700 can be displayed on a display of an electronic device (e.g., the computer system 900 described with respect to FIG. 9). The analytics search interface 700 can be associated with a workspace that includes teamspaces and/or multiple pages of a variety of types organized in a hierarchical arrangement (e.g., as described with respect to FIG. 3). The analytics search interface 700 includes an analytics review page 702 and the sidebar 404 described with respect to FIG. 4A.

In some implementations, analytics search interface 700 can be made available to all users of the workspace regardless of whether they are workspace owners or other users. The analytics search interface 700 can be provided to a user, for example, in response to a user input on a control item 719 on the sidebar 404. The analytics search interface 700 is configured to provide users with collective information associated with user engagement with the workspace. The user engagement can help to evaluate how useful or popular certain content on the workspace is, how well the workspace works for its users, and to identify content that is engaging or not engaging. The engagement information can include information associated with users' activity (e.g., users' engagement to view pages or users' engagement to edit pages), content (e.g., frequency of pages being viewed or edited), or searches (e.g., a frequency of keywords used in content searches, frequency of pages appearing in content search results, and frequency of click of content entries appearing in content search results). While the statistical information associated with the user's activity and search results can include statistical information that involves all content of the workspace, the statistical information associated with the content can be limited in some aspects to pages that the user has permission to access. As an example, a user can review statistics of how often pages that the user has created have been viewed or edited by other users but would not be able to review statistics on similar information associated with a page that the user is not permitted to access. As another example, a user can review a list of the most viewed and/or edited pages on the workspace (e.g., within a particular time range). However, the list can exclude pages that the user does not have permission to access. The permission hierarchy of the pages in the workspace is described with respect to FIG. 3. Overall, the analytics search interface 700 can provide a variety of statistical information that the users can use to evaluate and improve the workspace and/or its content.

The analytics review page 702 includes content of multiple categories under different tabs (e.g., identified on a tab bar 720). The analytics review page 702 in FIG. 7A includes an overview page (e.g., the "Overview" tab is highlighted on the tab bar 720). The multiple categories include, for example, members, content, and search. FIG. 7A illustrates an overview of the analytics review page 702, which includes multiple blocks (e.g., blocks 704 through 718) that summarize key analytics search results. The overview page, as shown, is divided into sections of "User engagement" and "Content engagement." The block 704 provides a number of active users of the workspace (e.g., users who are associated with an organization associated with the workspace) and an indication of the trend in the number of users (e.g., "4% less than previous 90 days"). The block 706 provides a number of active guest users and an indication of the trend in the number of guest users. Guest users can refer to users who are not associated with the workspace and/or the organization but have access to content on the workspace. The block 708 provides a summary (e.g., a list) of the most active teamspaces, the block 710 provides a summary of the most active viewers (e.g., a list of viewers that have viewed most pages on the workspace), and the block 712 provides a summary of most active editors of the workspace (e.g., users who have edited pages on the workspace). The block 714 provides the number of total views that the pages of the workspace have had within a time range (e.g., in the last 90 days), the block 716 provides a summary of unique page views (e.g., the number of pages viewed by one or more users), and the block 718 provides a summary of the most popular pages. A user can define the desired time range with a user input on the control item 715.

In FIG. 7B, the analytics review page 702 in FIG. 7A includes a search analytics block 722 (e.g., the "Search" tab is highlighted on the tab bar 720). The search analytics section provides statistical data associated with content searches performed by the users of the workspace. The content searches can be performed, for example, on the content search page 460 described with respect to FIG. 4F. The search analytics block 722 includes search queries that have been most frequently entered by the users of the workspace within a time frame (e.g., "Last 90 Days" in FIG. 7B).

Figure 8:
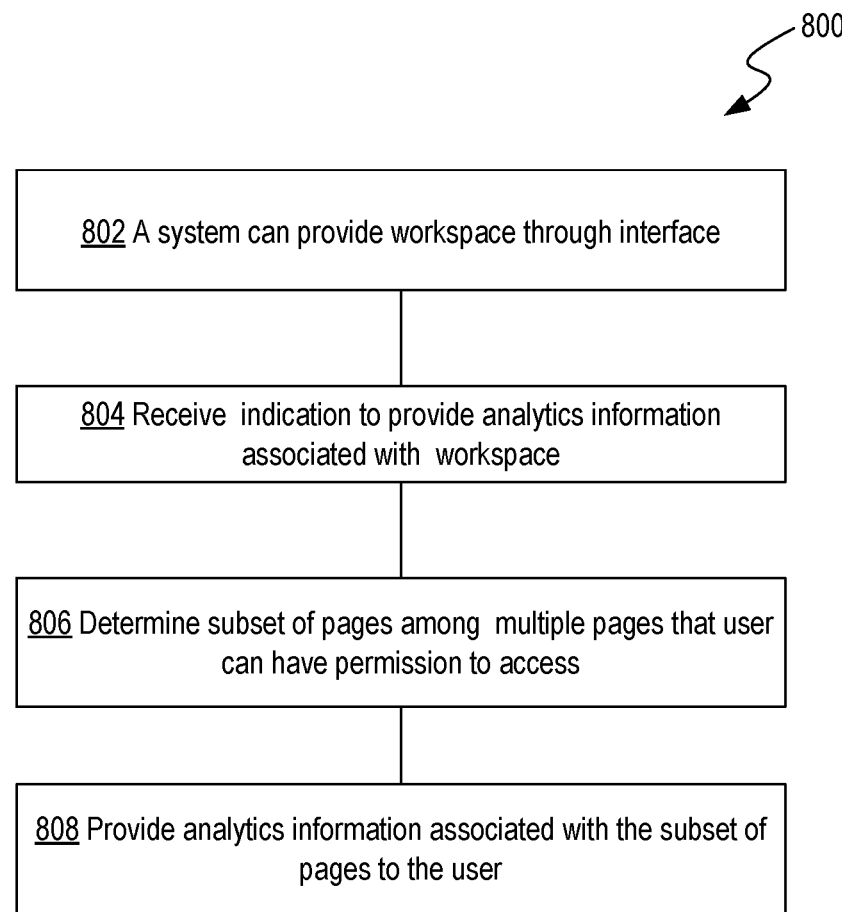
FIG. 8 is a flow diagram illustrating processes for providing an analytics search on an interface of the workspace.

FIG. 8 is a flow diagram illustrating processes 800 for providing analytics information associated with a workspace. The processes 800 can be performed by a system (e.g., the computer system 900 described with respect to FIG. 9). The processes 800 can include displaying a graphical user interface such as the analytics search interface 700 described with respect to FIGS. 7A and 7B, which is associated with a workspace.

At 802, a system can provide a workspace through an interface (e.g., the analytics search interface 700 in FIGS. 7A and 7B). The workspace can include multiple pages associated with multiple permissions (e.g., as described with respect to FIG. 3). A permission among the multiple permissions associated with a page among the multiple pages can define one or more users having access to the page. The multiple pages can be organized in a hierarchical structure including a parent page and a child page. The child page can inherit a permission associated with the parent page. As described with respect to FIG. 3, each page in the workspace is associated with an access permission defining users of the workspace and/or outside users who are allowed to access the page. The access permission can be determined by inheritance from parent pages, or the workspace can independently modify the access permission of pages.

At 804, the system can receive an indication to provide analytics information associated with the workspace to a user. The analytics information can include user engagement activities associated with the multiple pages within the workspace. The user engagement activities can be obtained based on metadata associated with the multiple pages. The metadata can include information associated with users' activities to view and edit pages. The metadata can also include a location, a group space, a creator, and an access permission level associated with each of the multiple pages.

At 806, based on the multiple permissions associated with multiple pages included in the workspace, the system can determine a subset of pages among the multiple pages. The user can have a permission to access the subset of pages. For example, the analytics review page 702 can only provide statistical information associated with pages that the user viewing the information has permission to access.

At 808, the system can provide analytics information associated with the subset of pages to the user. In some implementations, the analytics information associated with the workspace includes statistics on users' engagement to view pages, users' engagement to edit pages, frequency of pages being viewed or edited, frequency of keywords used in content searches, frequency of pages appearing in content search results, and frequency of click of content entries appearing in content search results (e.g., as described with respect to FIGS. 7A and 7B).

In some implementations, in an instance that a parent page of the multiple pages is associated with a first permission, and in response to receiving an indication to modify the first permission associated with the parent page, the system modifies the first permission to be a second permission. The second permission can identify a different group of users being allowed to access the parent page than the first permission. In response to the modification, the system modifies permissions associated with any of the child pages associated with the parent page to be the second permission.

In some implementations, in an instance that a child page of the multiple pages is associated with a third permission and in response to receiving an indication to modify the third permission associated with the child page, the system modifies the third permission to be a fourth permission. The fourth permission can identify a different group of users being allowed to access the child page than the third permission. In response to the modification, the system can forgo modifying a permission associated with a parent page associated with the child page.

In some implementations, the child page inherits the permission associated with the parent page at a time of creating the child page. In response to an indication (e.g., a user input or a series of user inputs provided on pages described with respect to FIGS. 4C-4E) received from the user to broaden the permission associated with the child page, the system can modify the permission associated with the child page so that the permission identifies a greater group of users being allowed to access the child page and the group of users being allowed to access the parent page.

In some implementations, the permissions associated with the page are selected from multiple permission levels. The multiple permission levels can include a permission to access a page, a permission to edit the page, a permission to share the page with users associated with the workspace, or a permission to share the page with users outside the workspace (e.g., as shown in FIG. 4B). In response to receiving an indication from the user to modify the permission associated with the page, the system can modify the permission between the multiple permission levels.

In some implementations, the workspace further includes one or more teamspaces that are sub-workspaces of the workspace. The parent pages can be located respectively under the workspace or the one or more teamspaces. The parent page can inherit a permission associated with the respective workspace or the one or more teamspaces.

In some implementations, the system receives an indication from the user to forgo allowing the page to be deleted. The user can have a permission to control the deletion of the page. In response to the indication, the system can forgo allowing the page to be deleted by any user regardless of the permission associated with the page. In some implementations, workspace owners associated with a workspace can have permissions to modify the access permission so that they can define whether a user can delete a page or edit the content on the page. For example, the workspace owner can modify the access permission so that no user has a permission to delete the page. Such implementations can be useful, for example, in instances of digital investigations for evidence stored in the workspace (e.g., e-discovery).

In some implementations, in response to receiving an indication to modify the permission to access the page from the user, the system adds an indication of the modification in the permission to access the page to an action log associated with the page. The action log is accessible by the creator of the page. The system can provide a notification of the modification in the permission to access the page to a group of users of the workspace. The group of users can have the authority to modify the access permission to the page.

Computer System

Figure 9:
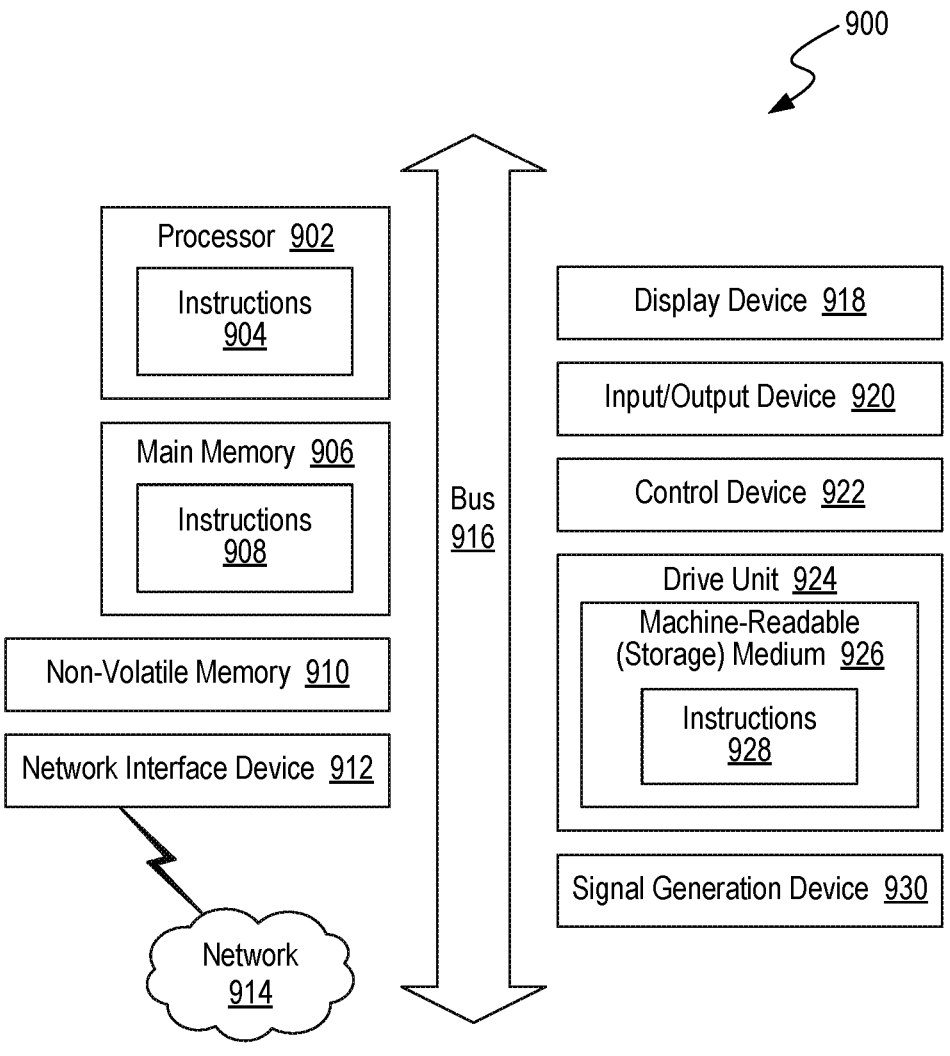
FIG. 9 is a block diagram that illustrates an example of a computer system in which at least some operations described herein can be implemented.

FIG. 9 is a block diagram that illustrates an example of a computer system 900 in which at least some operations described herein can be implemented. As shown, the computer system 900 can include: one or more processors 902, main memory 906, non-volatile memory 910, a network interface device 912, a display device 918, an input/output device 920, a control device 922 (e.g., keyboard and pointing device), a drive unit 924 that includes a machine-readable (storage) medium 926, and a signal generation device 930 that are communicatively connected to a bus 916. The bus 916 represents one or more physical buses and/or point-to-point connections that are connected by appropriate bridges, adapters, or controllers. Various common components (e.g., cache memory) are omitted from FIG. 9 for brevity. Instead, the computer system 900 is intended to illustrate a hardware device on which components illustrated or described relative to the examples of the figures and any other components described in this specification can be implemented.

The computer system 900 can take any suitable physical form. For example, the computer system 900 can share a similar architecture as that of a server computer, personal computer (PC), tablet computer, mobile telephone, wearable electronic device, network-connected ("smart") device (e.g., a television or home assistant device), AR/VR system (e.g., head-mounted display), or any electronic device capable of executing a set of instructions that specify action(s) to be taken by the computer system 900. In some implementations, the computer system 900 can be an embedded computer system, a system-on-chip (SOC), a single-board computer (SBC) system, or a distributed system such as a mesh of computer systems or include one or more cloud components in one or more networks. Where appropriate, one or more computer systems 900 can perform operations in real time, near real time, or in batch mode.

The network interface device 912 enables the computer system 900 to mediate data in a network 914 with an entity that is external to the computer system 900 through any communication protocol supported by the computer system 900 and the external entity. Examples of the network interface device 912 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 906, non-volatile memory 910, machine-readable medium 926) can be local, remote, or distributed. Although shown as a single medium, the machine-readable medium 926 can include multiple media (e.g., a centralized/distributed database and/or associated caches and servers) that store one or more sets of instructions 928. The machine-readable medium 926 can include any medium that is capable of storing, encoding, or carrying a set of instructions for execution by the computer system 900. The machine-readable medium 926 can be non-transitory or comprise a non-transitory device. In this context, a non-transitory storage medium can include a device that is tangible, meaning that the device has a concrete physical form, although the device can modify its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 910, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 904, 908, 928) set at various times in various memory and storage devices in computing device(s). When read and executed by the processor 902, the instruction(s) cause the computer system 900 to perform operations to execute elements involving the various aspects of the disclosure.

Remarks

The terms "example," "embodiment," and "implementation" are used interchangeably. For example, references to "one example" or "an example" in the disclosure can be, but are not necessarily, references to the same implementation, and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described that can be exhibited by some examples and not by others. Similarly, various requirements are described that can be requirements for some examples but not for other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the Detailed Description above using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein unless the Detailed Description above explicitly defines such terms. Accordingly, the actual scope of the invention encompasses not only the disclosed examples but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms either in this application or in a continuing application.

We claim:

1. A non-transitory, computer-readable storage medium comprising instructions recorded thereon, wherein the instructions when executed by at least one data processor of a system, cause the system to perform a function on a workspace that includes multiple pages, the workspace being presented on an interface, the processor being caused to:

provide a workspace through an interface,
wherein the workspace includes multiple pages associated with multiple permissions,
wherein a permission among the multiple permissions associated with a page among the multiple pages defines one or more users having access to the page,
wherein the multiple pages are organized in a hierarchical structure including a parent page and a child page, and
wherein the child page inherits a permission associated with the parent page;

receive an indication to provide analytics information associated with the workspace to a user;

wherein the analytics information includes user engagement activities associated with the multiple pages within the workspace, and wherein the user engagement activities are obtained based on metadata associated with the multiple pages;

based on the multiple permissions associated with multiple pages included in the workspace, determine a subset of pages among the multiple pages, wherein the subset of pages includes (i) pages that the user has a permission to access and (ii) pages that the user does not have permission to access but that have been shared outside the workspace or on the internet; and and provide analytics information associated with the subset of pages to the user.

2. The computer-readable storage medium of claim 1, wherein the processor is further caused to:

in an instance that a parent page of the multiple pages is associated with a first permission and in response to receiving an indication to modify the first permission associated with the parent page, modify the first permission to be a second permission, wherein the second permission identifies a different group of users being allowed to access the parent page than the first permission, and in response to the modification, modify permissions associated with any of the child pages associated with the parent page to be the second permission.

3. The computer-readable storage medium of claim 1, wherein the processor is further caused to:

in an instance that a child page of the multiple pages is associated with a third permission and in response to receiving an indication to modify the third permission associated with the child page, modify the third permission to be a fourth permission, wherein the fourth permission identifies a different group of users being allowed to access the child page than the third permission, and in response to the modification, forgo modifying a permission associated with a parent page associated with the child page.

4. The computer-readable storage medium of claim 1, wherein the child page inherits the permission associated with the parent page at a time of creating the child page; and in response to an indication received from the user to broaden the permission associated with the child page, the processor is further caused to modify the permission associated with the child page so that the permission identifies a greater group of users being allowed to access the child page the group of users being allowed to access the parent page.

5. The computer-readable storage medium of claim 1, wherein the permissions associated with the page is selected from multiple permission levels, wherein the multiple permission levels include a permission to access a page, a permission to edit the page, a permission to share the page with users associated with the workspace, or a permission to share the page with users outside the workspace, and wherein the processor is further caused to, in response to receiving an indication from the user to modify the permission associated with the page, modify the permission between the multiple permission levels.

6. The computer-readable storage medium of claim 1, wherein the processor is further caused to:

receive an indication from the user to prevent deletion of the page, wherein the user has a permission to control the deletion of the page, and in response to the indication, prevent the page to be deleted by any users regardless of the permission associated with the page.

7. The computer-readable storage medium of claim 1, wherein the workspace further includes one or more teamspaces that are sub-workspaces of the workspace;

wherein the parent pages are located respectively under the workspace or the one or more teamspaces, and wherein the parent page inherits a permission associated with the respective workspace or the one or more teamspaces.

8. The computer-readable storage medium of claim 1, wherein the processor is further caused to:

in response to receiving an indication to modify the permission to access the page from the user, modify the permission to access the page, add an indication of the modification to an action log associated with the page, wherein the action log is accessible by a creator of the page, and provide a notification of the modification in the permission to access the page to a group of users of the workspace, wherein the group of users have an authority to modify the access permission to the page.

9. The computer-readable storage medium of claim 1, wherein the analytics information associated with the workspace comprises statistics on users' engagement to view pages, users' engagement to edit pages, frequency of pages being viewed or edited, frequency of keywords used in content searches, frequency of pages appearing in content search results, and frequency of click of content entries appearing in content search results.

10. A system comprising:

at least one hardware processor; and at least one non-transitory memory storing instructions, which, when executed by the at least one hardware processor, cause the system to perform a function on a workspace that includes multiple pages, the workspace being presented on an interface, the processor being caused to:

provide a workspace through an interface, wherein the workspace includes multiple pages associated with multiple permissions, wherein a permission among the multiple permissions associated with a page among the multiple pages defines one or more users having access to the page, wherein the multiple pages are organized in a hierarchical structure including a parent page and a child page, and wherein the child page inherits a permission associated with the parent page;

receive an indication to provide analytics information associated with the workspace to a user;

based on the multiple permissions associated with multiple pages included in the workspace, determine a subset of pages among the multiple pages;

wherein the subset of pages includes (i) pages that the user has a permission to access and (ii) pages that the user does not have permission to access but that have been shared outside the workspace or on the internet; and provide analytics information associated with the subset of pages to the user.

11. The system of claim 10, wherein the processor is further caused to:

in an instance that a parent page of the multiple pages is associated with a first permission and in response to receiving an indication to modify the first permission associated with the parent page, modify the first permission to be a second permission, wherein the second permission identifies a different group of users being allowed to access the parent page than the first permission, and in response to the modification, modify permissions associated with any of the child pages associated with the parent page to be the second permission.

12. The system of claim 10, wherein the processor is further caused to:

in an instance that a child page of the multiple pages is associated with a third permission and in response to receiving an indication to modify the third permission associated with the child page, modify the third permission to be a fourth permission, wherein the fourth permission identifies a different group of users being allowed to access the child page than the third permission, and in response to the modification, forgo modifying a permission associated with a parent page associated with the child page.

13. The system of claim 10, wherein the child page inherits the permission associated with the parent page at a time of creating the child page; and in response to an indication received from the user to broaden the permission associated with the child page, the processor is further caused to modify the permission associated with the child page so that the permission identifies a greater group of users being allowed to access the child page the group of users being allowed to access the parent page.

14. The system of claim 10, wherein the permissions associated with the page is selected from multiple permission levels, wherein the multiple permission levels include a permission to access a page, a permission to edit the page, a permission to share the page with users associated with the workspace, or a permission to share the page with users outside the workspace, and wherein the processor is further caused to, in response to receiving an indication from the user to modify the permission associated with the page, modify the permission between the multiple permission levels.

15. The system of claim 10, wherein the processor is further caused to:

receive an indication from the user to prevent deletion of the page, wherein the user has a permission to control the deletion of the page, and in response to the indication, prevent the page to be deleted by any users regardless of the permission associated with the page.

16. The system of claim 10, wherein the workspace further includes one or more teamspaces that are sub-workspaces of the workspace;

wherein the parent pages are located respectively under the workspace or the one or more teamspaces, and wherein the parent page inherits a permission associated with the respective workspace or the one or more teamspaces.

17. The system of claim 10, wherein the processor is further caused to:

in response to receiving an indication to modify the permission to access the page from the user, modify the permission to access the page, add an indication of the modification to an action log associated with the page, wherein the action log is accessible by a creator of the page, and provide a notification of the modification in the permission to access the page to a group of users of the workspace, wherein the group of users have an authority to modify the access permission to the page.

18. A method for providing analytics information associated with a workspace, the method comprising:

providing a workspace through an interface, wherein the workspace includes multiple pages associated with multiple permissions, wherein a permission among the multiple permissions associated with a page among the multiple pages defines one or more users having access to the page, wherein the multiple pages are organized in a hierarchical structure including a parent page and a child page, and wherein the child page inherits a permission associated with the parent page;

receiving an indication to provide analytics information associated with the workspace to a user;

based on the multiple permissions associated with multiple pages included in the workspace, determining a subset of pages among the multiple pages wherein the subset of pages includes (i) pages that the user has a permission to access and (ii) pages that the user does not have permission to access but that have been shared outside the workspace or on the internet; and providing analytics information associated with the subset of pages to the user.

19. The method of claim 18, further comprising:

in an instance that a parent page of the multiple pages is associated with a first permission and in response to receiving an indication to modify the first permission associated with the parent page, modifying the first permission to be a second permission, wherein the second permission identifies a different group of users being allowed to access the parent page than the first permission, and in response to the modification, modifying permissions associated with any of the child pages associated with the parent page to be the second permission.

20. The method of claim 18, further comprising:

in an instance that a child page of the multiple pages is associated with a third permission and in response to receiving an indication to modify the third permission associated with the child page, modify the third permission to be a fourth permission,
wherein the fourth permission identifies a different
group of users being allowed to access the child
page than the third permission, and in response to the modification,
forgo modifying a permission associated with a parent
page associated with the child page.

\* \* \* \* \*